(12) United States Patent
Takahashi et al.

(10) Patent No.: US 10,796,720 B2
(45) Date of Patent: Oct. 6, 2020

(54) DISC DEVICE

(71) Applicant: Panasonic Intellectual Property Management Co., Ltd., Osaka (JP)

(72) Inventors: Hiroshi Takahashi, Hyogo (JP); Yukio Morioka, Osaka (JP); Hirohito Tsuruta, Osaka (JP); Takuto Yamazaki, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/641,406

(22) PCT Filed: Oct. 12, 2018

(86) PCT No.: PCT/JP2018/038113
§ 371 (c)(1),
(2) Date: Feb. 24, 2020

(87) PCT Pub. No.: WO2019/111533
PCT Pub. Date: Jun. 13, 2019

(65) Prior Publication Data
US 2020/0243112 A1 Jul. 30, 2020

(30) Foreign Application Priority Data
Dec. 7, 2017 (JP) ................................. 2017-235498

(51) Int. Cl.
*G11B 17/05* (2006.01)
*G11B 17/26* (2006.01)
*G11B 33/04* (2006.01)

(52) U.S. Cl.
CPC .............. *G11B 17/05* (2013.01); *G11B 17/26* (2013.01); *G11B 33/0477* (2013.01)

(58) Field of Classification Search
CPC ....... G11B 17/05; G11B 17/26; G11B 33/0477
(Continued)

(56) References Cited

U.S. PATENT DOCUMENTS

| 4,763,962 A * | 8/1988 | Ackeret | G11B 23/023 |
| | | | 312/333 |
| 6,226,253 B1 * | 5/2001 | Ogawa | G11B 17/021 |
| | | | 369/30.9 |

(Continued)

FOREIGN PATENT DOCUMENTS

| JP | 62-225283 | 10/1987 |
| JP | 2011-243236 | 12/2011 |

(Continued)

OTHER PUBLICATIONS

International Search Report dated Nov. 13, 2018 in International (PCT) Application No. PCT/JP2018/038113 with English translation.

*Primary Examiner* — Allen T Cao
(74) *Attorney, Agent, or Firm* — Wenderoth, Lind & Ponack, L.L.P.

(57) ABSTRACT

The disc device that includes a disc tray which stores a plurality of stacked discs, a tray carrier which transports the disc tray, and a disc selector which supplies one disc of the plurality of discs stacked on the disc tray to a drive unit. The disc selector includes a disc selector spindle that supports the plurality of discs, a disc press on which an upper surface of an uppermost disc of the plurality of discs supported by the disc selector spindle abuts, a displacement amount detection mechanism that detects a displacement amount of the disc press displaced according to thicknesses of the plurality of supported discs, and a thickness detection unit that detects a thickness of each of the plurality of discs based on the detected displacement amount of the disc press.

9 Claims, 31 Drawing Sheets

(58) Field of Classification Search
USPC .......................................................... 720/615
See application file for complete search history.

(56) References Cited

U.S. PATENT DOCUMENTS

| | | |
|---|---|---|
| 2011/0283299 A1 | 11/2011 | Takano et al. |
| 2013/0263162 A1 | 10/2013 | Yoshida et al. |
| 2013/0326549 A1 | 12/2013 | Nishi et al. |
| 2014/0289750 A1 | 9/2014 | Yoshida et al. |
| 2015/0024161 A1 | 1/2015 | Higaki et al. |
| 2017/0236545 A1* | 8/2017 | Altknecht ............ G11B 17/228 720/714 |

FOREIGN PATENT DOCUMENTS

| | | |
|---|---|---|
| JP | 2013-206498 | 10/2013 |
| JP | 2014-13639 | 1/2014 |

* cited by examiner

DISC DEVICE

TECHNICAL FIELD

The present disclosure relates to a disc device that supplies one disc of a plurality of stacked discs (a disc-shaped information storage medium such as a CD and a DVD) to a drive unit.

BACKGROUND ART

In the related art, for example, a device described in Patent Document 1 (JP 2014-13639 A) is known as this type of disc device. FIG. 25 is a perspective view schematically illustrating a configuration of a disc device of the related art.

The disc device of the related art includes two magazine stockers 101 and 101. Two magazine stockers 101 and 101 are provided on a bottom chassis 111 so as to face each other. In FIG. 25, one (front side) magazine stocker 101 is not illustrated.

Each magazine stocker 101 stores a plurality of magazines 102. Each magazine 102 includes a disc tray 121 that stores a plurality of discs. A tray carrier 103 is provided between two magazine stockers 101 and 101.

The tray carrier 103 is configured to pull out the disc tray 121 from one magazine 102 selected from the plurality of magazines 102 and transport the disc tray 121 to the vicinity of a plurality of drive units 104 arranged at the rear of the device.

The drive unit 104 is a device that records or reproduces information on the disc. The plurality of drive units 104 is stacked in a vertical direction, and is arranged adjacent to the magazine stockers 101 and 101 at the rear of the device. A disc selector 105 is provided between the plurality of drive units 104 arranged so as to be stacked adjacent to one magazine stocker 101 and the plurality of drive units 104 arranged so as to be stacked adjacent to the other magazine stocker 101.

The disc selector 105 is configured to supply the plurality of discs stored in the disc tray 121 to the plurality of drive units 104 one by one.

PRIOR ART DOCUMENT

Patent Document

Patent Document 1: JP 2014-13639 A

SUMMARY OF THE INVENTION

Problems to be Solved by the Invention

The disc selector 105 selects a desired disc by pulling up all the stored discs once from a state in which the plurality of discs is stored in the disc tray 121. However, it is desired to select the desired disc from the beginning in order to reduce a time for selecting the disc. In this case, it is necessary to accurately know a thickness of the disc.

The present disclosure provides a disc device having a mechanism that detects the thickness of the disc.

Means for Solving the Problems

A disc device according to the present disclosure is a disc device including a disc tray which stores a plurality of stacked discs, a tray carrier which transports the disc tray, and a disc selector which supplies one disc of the plurality of discs stacked on the disc tray to a drive unit. The disc selector includes a disc selector spindle that supports the plurality of discs, a disc press on which an upper surface of an uppermost disc of the plurality of discs supported by the disc selector spindle abuts, a displacement amount detection mechanism that detects a displacement amount of the disc press displaced according to thicknesses of the plurality of supported discs, and a thickness detection unit that detects a thickness of each of the plurality of discs based on the detected displacement amount of the disc press.

Effects of the Invention

According to the disc device of the present disclosure, it is possible to provide the disc device with improved accuracy in detecting the thickness of the disc.

MODE FOR CARRYING OUT THE INVENTION

Figure 1:
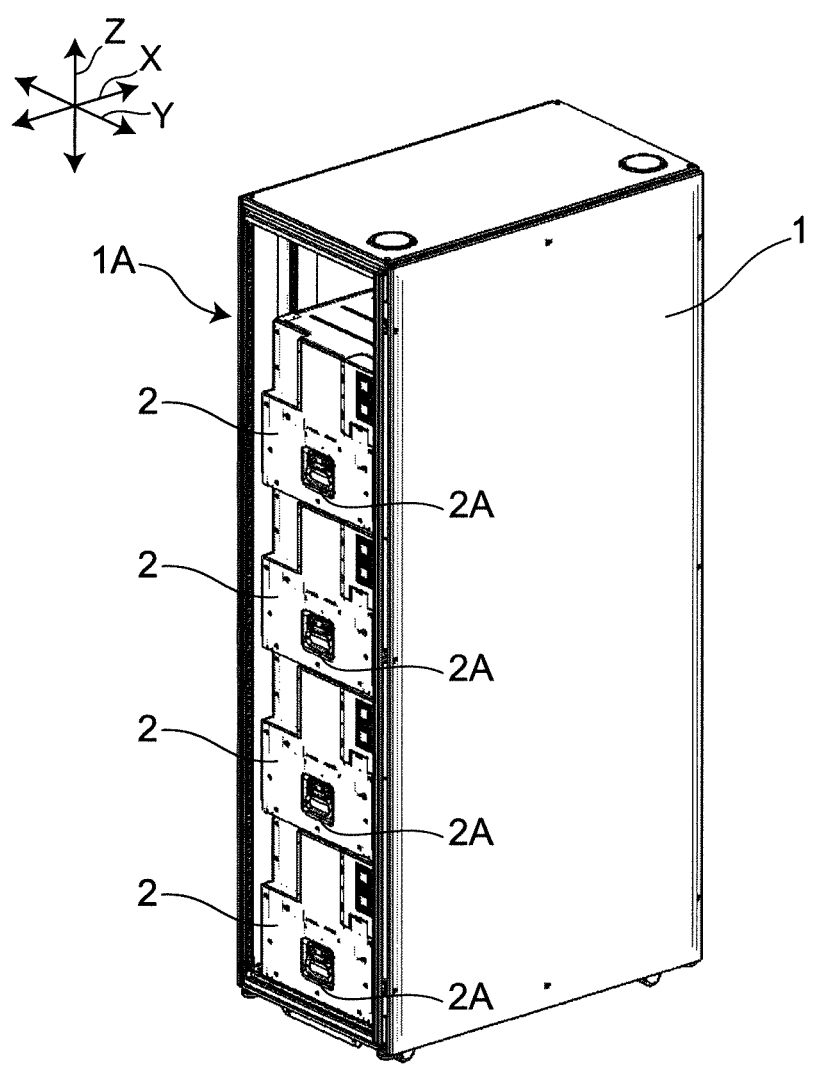
FIG. 1 is a perspective view of a storage that stores a plurality of disc devices according to an embodiment.

According to a first aspect of the present disclosure, there is provided a disc device that includes a disc tray which stores a plurality of stacked discs, a tray carrier which transports the disc tray, and a disc selector which supplies one disc of the plurality of discs stacked on the disc tray to a drive unit. The disc selector includes a disc selector spindle that supports the plurality of discs, a disc press on which an upper surface of an uppermost disc of the plurality of discs supported by the disc selector spindle abuts, a displacement amount detection mechanism that detects a displacement amount of the disc press displaced according to thicknesses of the plurality of supported discs, and a thickness detection unit that detects a thickness of each of the plurality of discs based on the detected displacement amount of the disc press.

According to a second aspect of the present disclosure, in the disc device according to the first aspect, the displacement amount detection mechanism includes a column that is connected to the disc press, and is displaced in the same direction as a displacement direction of the disc press, a film that is attached to the column, and has a plurality of slits formed in a direction perpendicular to the displacement direction of the column, and an encoder that counts the number of slits displaced together with the disc press in the displacement direction of the disc press.

According to a third aspect of the present disclosure, in the disc device according to the second aspect, the encoder includes a plurality of optical elements arranged at intervals along the displacement direction of the disc press within a length of an interval between the slits.

According to a fourth aspect of the present disclosure, in the disc device according to any one of the first to third aspects, the displacement amount detection mechanism includes a shaft that is connected to the disc press, and extends along a displacement direction of the disc selector, and a guide that guides the shaft in an insertable manner, and the guide is supported by a chassis of the disc selector.

According to a fifth aspect of the present disclosure, in the disc device according to the fourth aspect, the displacement amount detection mechanism includes a conical coil spring that is urged in a direction in which the disc press is separated from the chassis between the disc press and the chassis of the disc selector.

According to a sixth aspect of the present disclosure, in the disc device according to the second or third aspect, the thickness detection unit detects the thickness of each of the plurality of discs based on the displacement amount detected by the encoder in a state in which all the plurality of discs stacked on the disc tray is supported.

According to a seventh aspect of the present disclosure, in the disc device according to the sixth aspect, the thickness detection unit detects the thickness of each disc by detecting a total thickness of the stacked discs and dividing the detected total thickness of the discs by the number of stacked discs.

According to an eighth aspect of the present disclosure, in the disc device according to the sixth aspect, the thickness detection unit detects the thickness of each disc based on each displacement amount detected by the encoder when the plurality of discs supported by the disc selector spindle is removed one by one.

According to a ninth aspect of the present disclosure, the disc device according to any one of the first to eighth aspects further includes a storage unit that stores the detected thickness of each disc.

Hereinafter, an embodiment will be described in detail while appropriately referring to the drawings. However, unnecessarily detailed description may be omitted. For example, detailed descriptions of already well-known matters and redundant descriptions for substantially the same configuration may be omitted. By doing this, the following description is avoided from being unnecessarily redundant, and thus, it is easy to facilitate understanding of those skilled in the art.

The inventors provide the accompanying drawings and the following description in order for those skilled in the art to fully understand the present disclosure, and do not intend to limit the subject matter described in the claims by the accompanying drawings and the following description.

In the following description, terms indicating directions such as "up", "down", "right", "left", "front", and "oblique" are used on the assumption that these terms are usually used for the sake of convenience in description. However, these terms do not mean that a use state of a disc device of the present disclosure is limited.

Embodiment

FIG. 1 is a perspective view of a storage that stores a plurality of disc devices according to an embodiment.

A storage 1 is, for example, a 19-inch rack. The storage 1 is a rectangular parallelepiped box-shaped member, and has an opening 1A on a front surface. In the storage 1, a length in a depth direction X is, for example, 1,000 mm, a length in a horizontal direction Y is, for example, 600 mm, and a length in a vertical direction Z is, for example, 2,000 mm. The storage 1 includes a plurality of drawers 2 as illustrated in FIG. 1. In the embodiment, four drawers 2 are arranged in the vertical direction Z. Each drawer 2 is configured to be drawn in and out through the opening 1A of the storage 1. Each drawer 2 is configured to be operable independently of the other drawers 2, and even when the storage 1 is powered on, the drawer 2 can be drawn out without obstructing operations of the other drawers 2. However, electrical control is performed such that only one drawer 2 can be drawn out within the same rack. Accordingly, it is possible to prevent a center of gravity from moving forward by drawing out the plurality of drawers 2 and the storage 1 from falling down.

Figure 2:
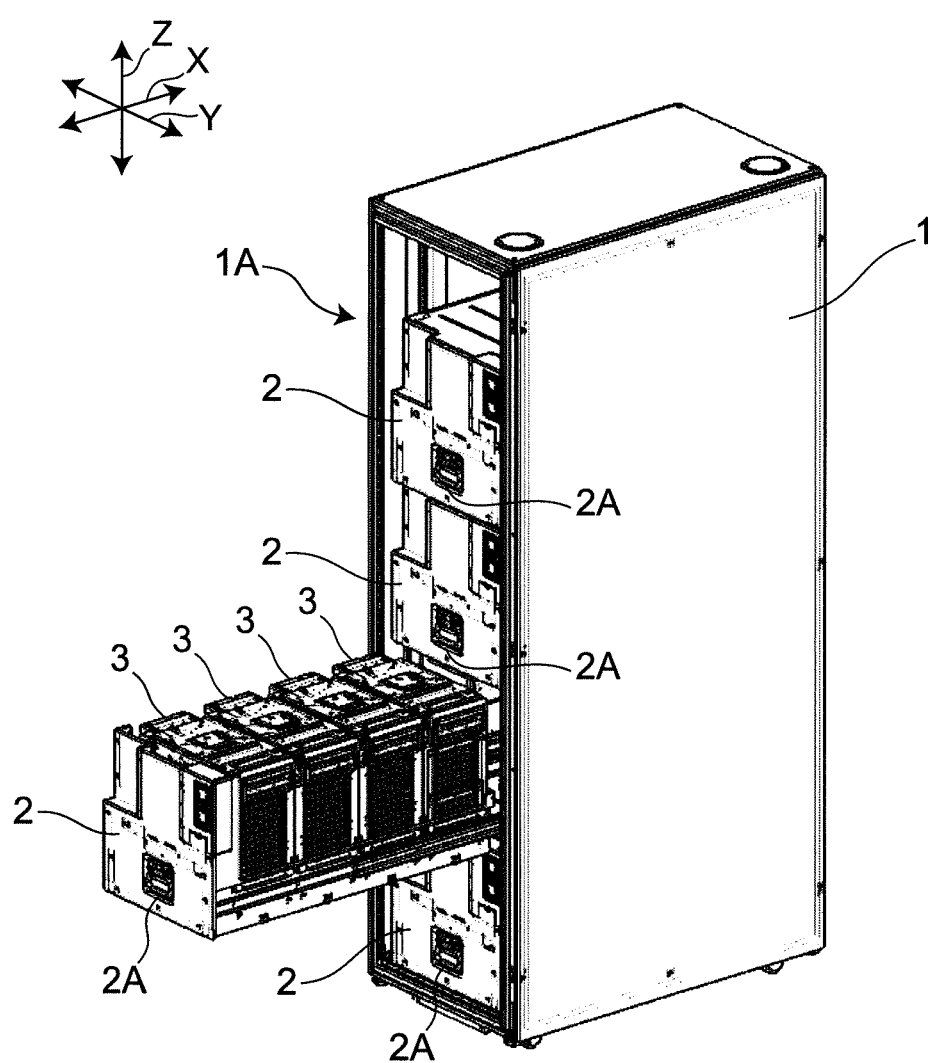
FIG. 2 is a perspective view illustrating a state in which one drawer is drawn out from the storage of FIG. 1.

FIG. 2 is a perspective view illustrating a state in which one drawer 2 is drawn out from the storage 1 of FIG. 1.

As illustrated in FIG. 2, the drawer 2 stores the plurality of disc devices (also referred to as changer modules) 3 according to the embodiment. In the embodiment, four disc devices 3 are stored in one drawer 2 in the depth direction X. A handle 2A is provided on a front wall of the drawer 2. The handle 2A is pushed or pulled in the depth direction X, and thus, the drawer 2 can be easily drawn in and out of the storage 1.

Figure 3:
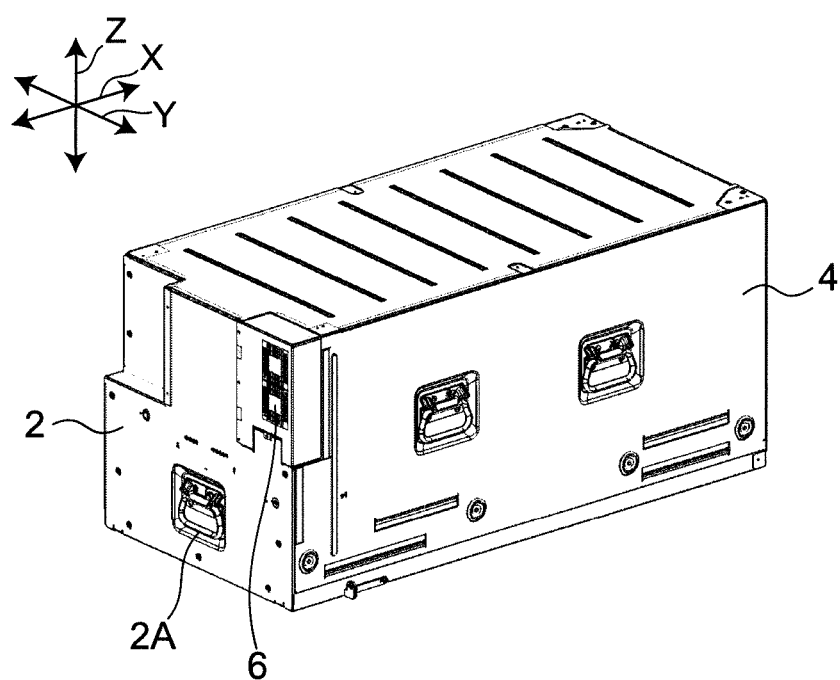
FIG. 3 is a perspective view illustrating a state in which the drawer of FIG. 2 is stored in a case.
Figure 4:
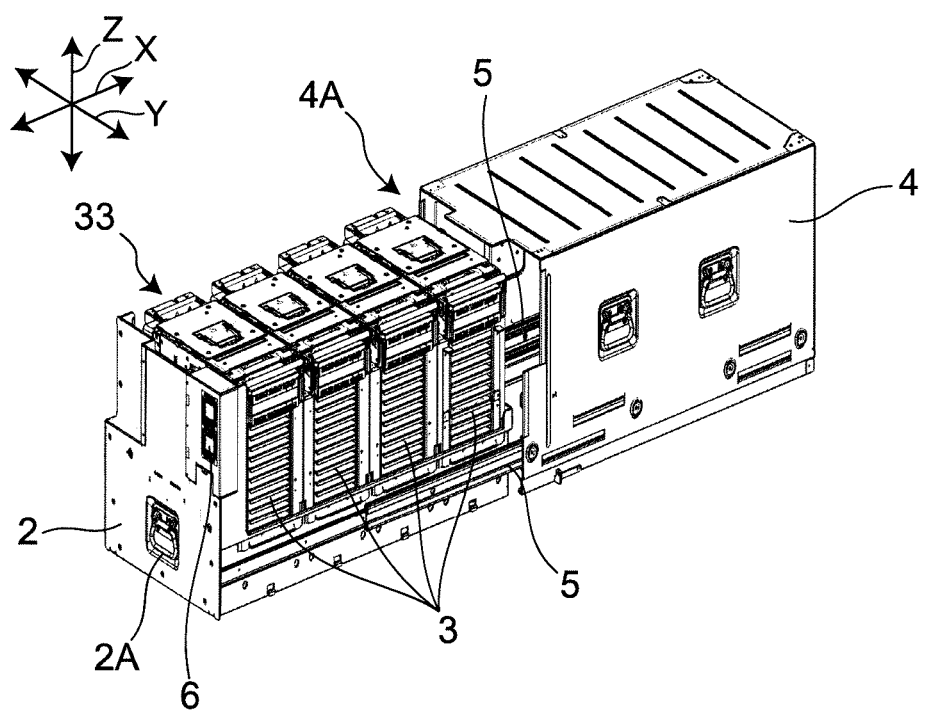
FIG. 4 is a perspective view illustrating a state in which the drawer of FIG. 2 is drawn out of the case.

FIG. 3 is a perspective view illustrating a state in which the drawer 2 is stored in a case 4. FIG. 4 is a perspective view illustrating a state in which the drawer 2 is drawn out of the case 4.

When the drawer 2 is located within the storage 1, the drawer is stored within the case 4 as illustrated in FIG. 3. Accordingly, dust is prevented from entering each disc device 3 stored within the drawer 2. The case 4 is a rectangular parallelepiped box-shaped member, and has an opening 4A (see FIG. 4) on a front surface. The case 4 is attachably and detachably fixed within the storage 1. In the embodiment, four cases 4 are stacked in the vertical direction Z.

When the drawer 2 is drawn out from the storage 1, the drawer 2 is drawn out of the case 4 through the opening 4A of the case 4 as illustrated in FIG. 4. A pair of rails 5 are provided at the case 4 so as to guide the movement of the drawer 2 in the depth direction X.

A fan unit 6 that blows cooling air for cooling the disc devices 3 is attached detachably to the front wall of the drawer 2.

Figure 5:
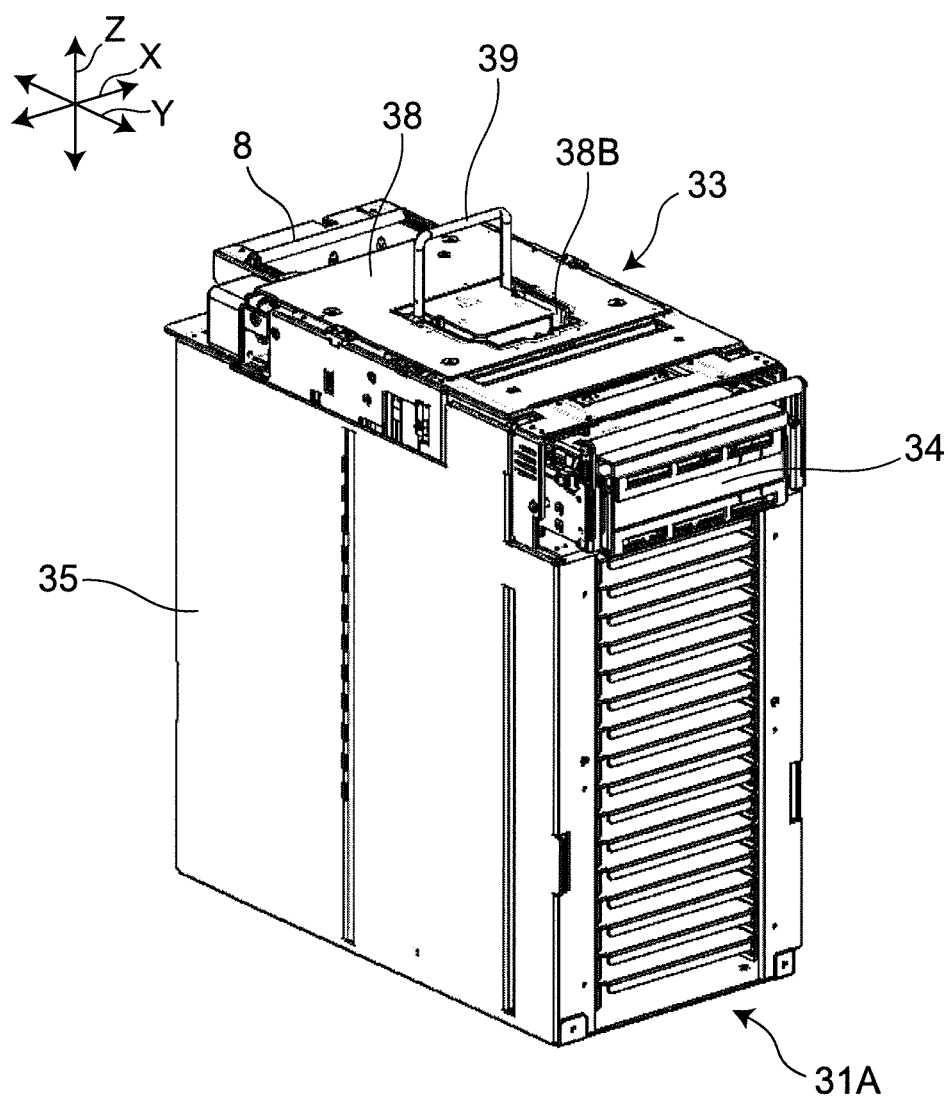
FIG. 5 is a perspective view of the disc device according to the embodiment.
Figure 6:
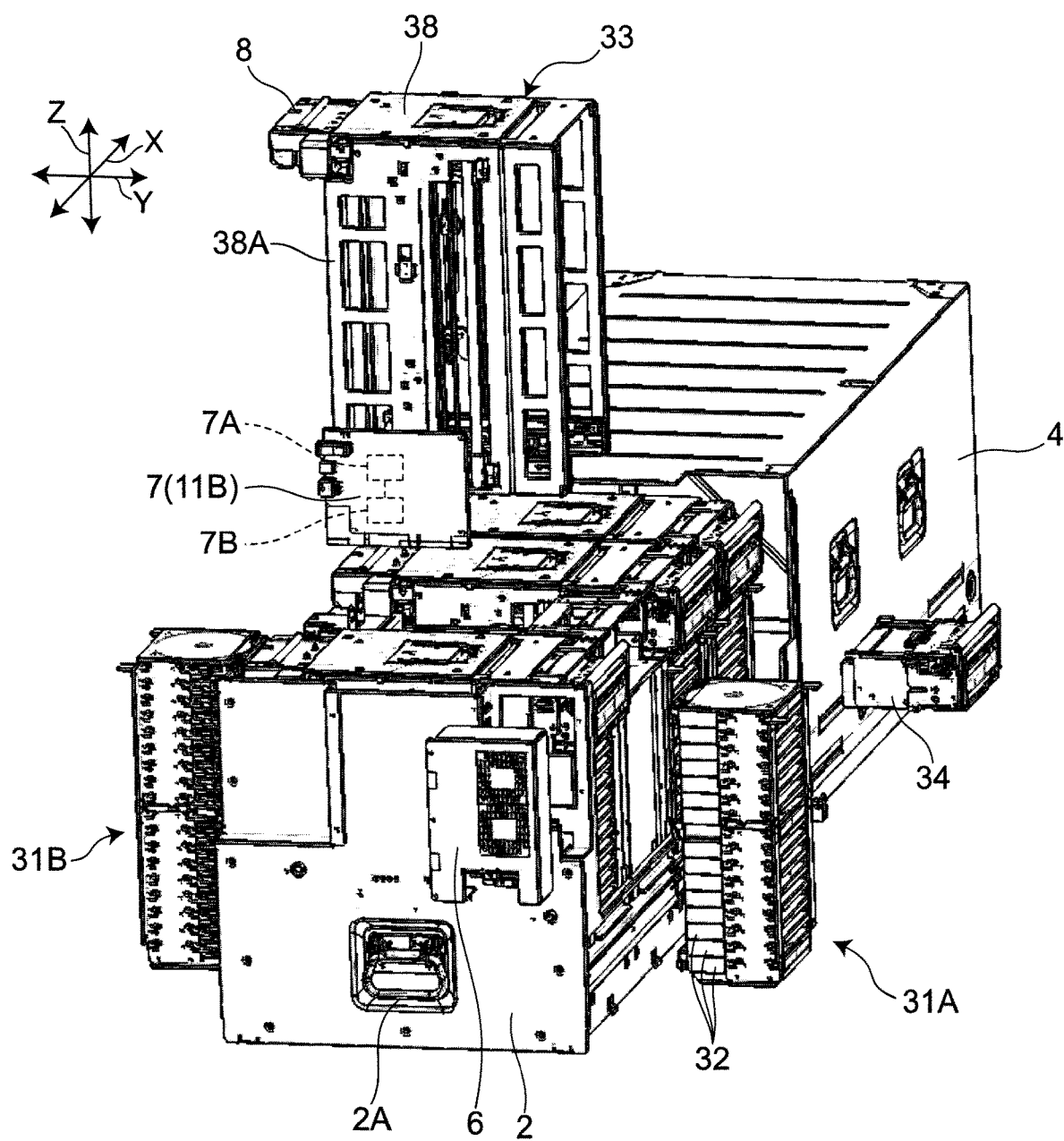
FIG. 6 is a perspective view illustrating a state in which the drawer of FIG. 2 is dawn out of the case, and is an exploded view illustrating one disc device stored in the drawer.

FIG. 5 is a perspective view of the disc device 3. FIG. 6 is a perspective view illustrating a state in which the drawer 2 is drawn out from the case 4, and is an exploded view illustrating one disc device 3 stored in the drawer 2.

The disc device 3 includes two tray stacks 31A and 31B facing each other in the horizontal direction Y.

A plurality of disc trays 32 is stored in the tray stacks 31A and 31B. The tray stacks 31A and 31B are configured to hold the plurality of disc trays 32 in the vertical direction Z. In the embodiment, the tray stack 31A disposed on a right side when viewed from the front of the drawer 2 is configured to hold 16 disc trays 32 in the vertical direction Z. The tray stack 31B disposed on a left side when viewed from the front of the drawer 2 is configured to hold 18 disc trays 32 in the vertical direction Z.

The disc tray 32 is configured to store the plurality of discs. In the embodiment, the disc tray 32 is configured to store 12 discs in a stacked state. The disc is, for example, an optical disc having a recording layer on both sides with a diameter of 12 cm. A thickness of the disc is, for example, 1.38 mm.

A changer unit 33 for transporting the disc tray 32 and the disc is provided between the tray stacks 31A and 31B.

A drive unit 34 is a device that records or reproduces information on the disc. In the embodiment, the drive unit 34 is a tray-type disc drive that loads the disc by using the tray. The drive unit 34 is attached to a casing 35.

The tray stacks 31A and 31B and the changer unit 33 are stored within the casing 35. As illustrated in FIG. 4, the tray stacks 31A and 31B are configured to be attachable and detachable by being pushed or pulled in the horizontal direction Y in a state in which the drawer 2 is drawn out of the case 4. The tray stacks 31A and 31B may be divided into a plurality of stages (for example, upper and lower two stages) such that the tray stacks 31A and 31B are easily attached to and detached from the casing 35. The changer unit 33 is configured to be attachable and detachable from the casing 35 by being pushed or pulled in the vertical direction Z in a state in which the drawer 2 is drawn out of the case 4 as illustrated in FIG. 4.

As illustrated in FIG. 6, a control unit 7 that controls various operations including a disc transport operation of each disc device 3 and a blowing operation of the fan unit 6 is attached detachably to a rear side of the front wall of the drawer 2. The control unit 7 is connected to a host computer that manages data, for example, in a wired or wireless manner. The host computer sends a command to the control unit 7 to perform an operation such as writing or reading data to or from a designated disc based on an instruction from an operator. The control unit 7 controls operations of the units such as the fan unit 6, the changer unit 33, and the drive unit 34 according to the command. The control unit 7 includes a data processing unit 7A that performs various data processing and a storage unit 7B that stores various data. The data processing unit 7A may be constituted by, for example, a plurality of CPUs, microprocessors, or field-programmable gate arrays (FPGAs), or may be constituted by one CPU, microprocessor, or FPGA. The storage unit 7B may be constituted by a plurality of memories, hard discs, and solid-state drives (SSDs), or may be constituted by one memory, hard disc, or SSD.

Figure 7A:
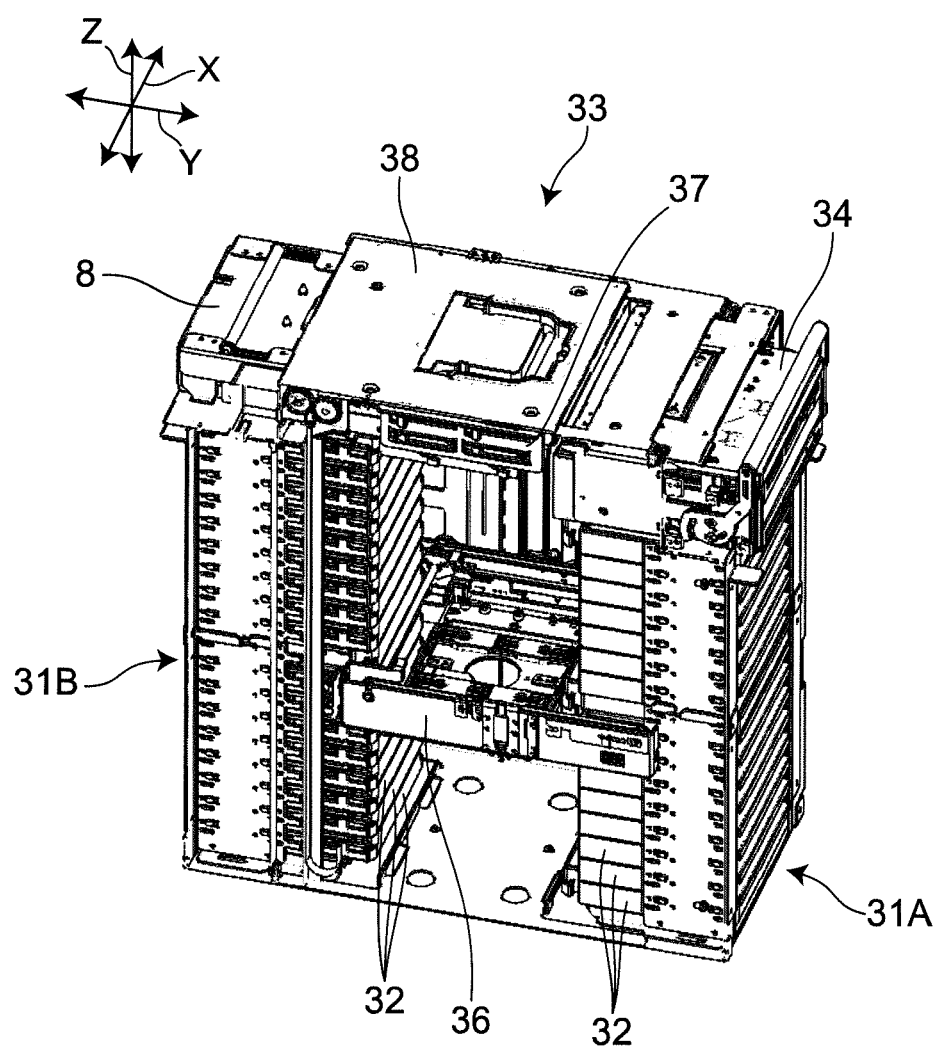
FIG. 7A is a perspective view illustrating a configuration of a changer unit included in the disc device of FIG. 5 and a disc transport operation.

A connecting unit 8 is attached to the changer unit 33 above the tray stack 31B (see FIG. 7A). As illustrated in FIG. 5, a handle 39 having a U-shaped cross-section is provided on an upper surface of a chassis 38 of the changer unit 33. In FIG. 5, the changer unit 33 is configured to be attached detachably by lifting the handle 39 from a recess 38B and moving the handle 39 relative to the casing 35 in the vertical direction Z. A guide (not illustrated) that guides the movement of the changer unit 33 in the vertical direction Z is provided at the casing 35. When a user releases the handle 39, the handle is stored within a U-shaped recess 38B formed in the upper surface of the chassis 38.

FIGS. 7A to 7H are perspective views illustrating a configuration of the changer unit 33 and the disc transport operation.

The changer unit 33 includes the tray carrier 36 and the disc selector 37 as illustrated in FIG. 7A. The tray carrier 36 and the disc selector 37 are attached to a chassis 38 illustrated in FIG. 6. FIGS. 7A to 7H illustrate a state in which a front wall 38A of the chassis 38 illustrated in FIG. 6 is removed in order to easily illustrate an internal configuration of the changer unit 33.

Figure 7B:
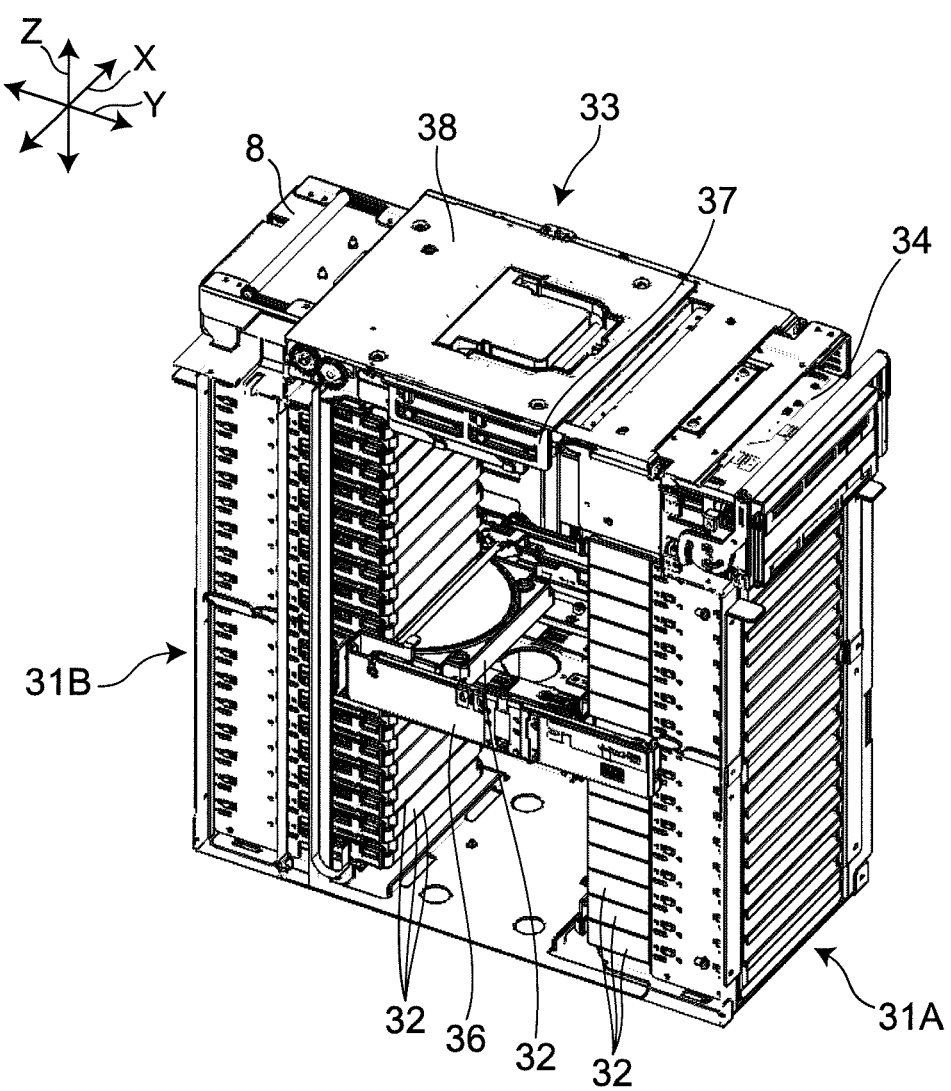
FIG. 7B is a perspective view illustrating the disc transport operation subsequent to FIG. 7A.
Figure 7C:
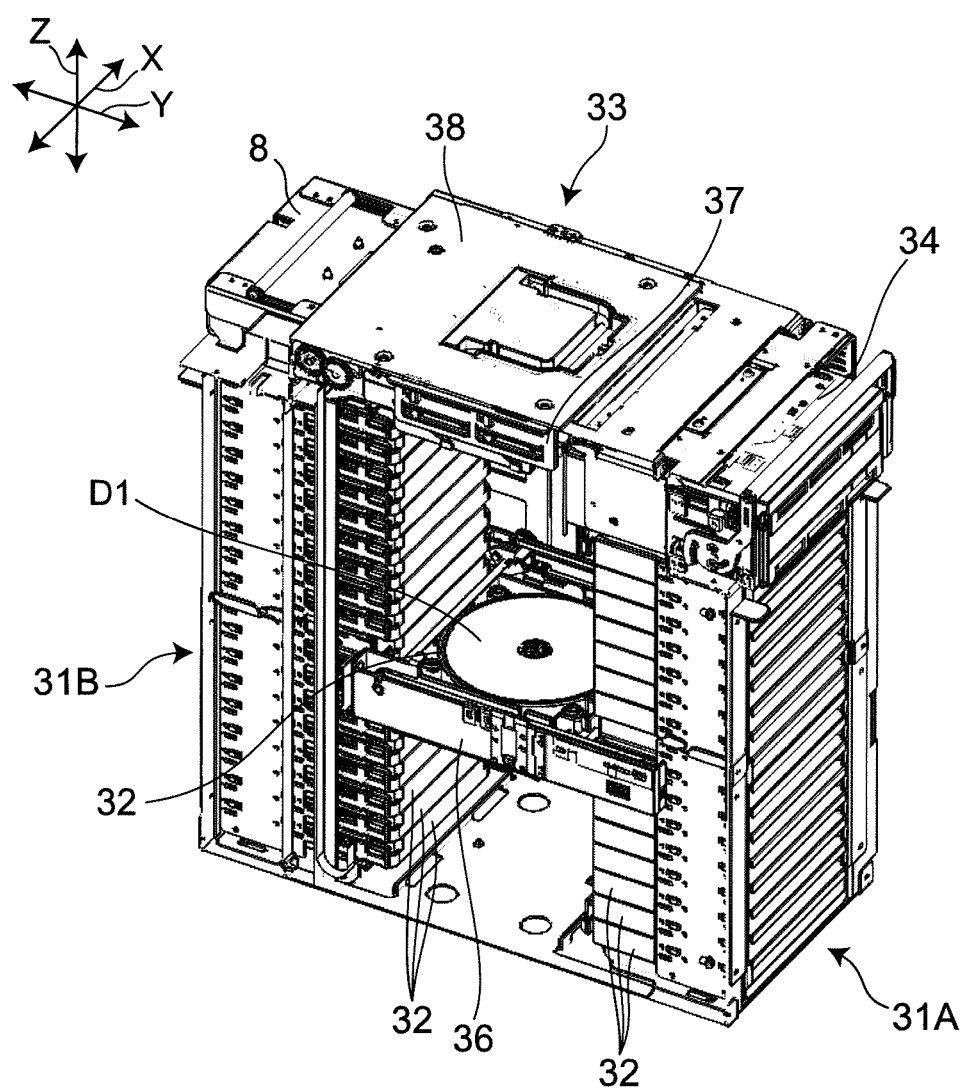
FIG. 7C is a perspective view illustrating the disc transport operation subsequent to FIG. 7B.
Figure 7D:
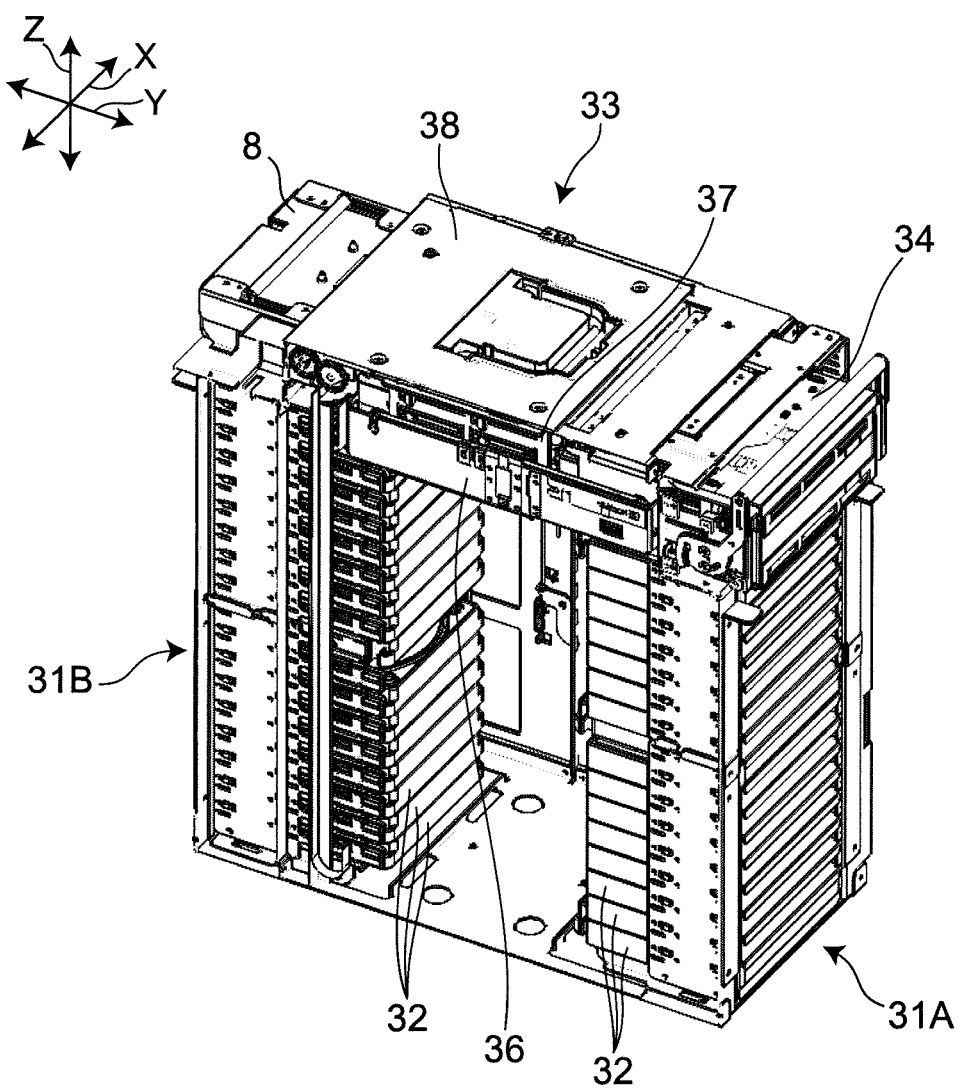
FIG. 7D is a perspective view illustrating the disc transport operation subsequent to FIG. 7C.

As illustrated in FIGS. 7B to 7D, the tray carrier 36 is configured to transport one disc tray 32 selected from the plurality of disc trays 32 to the vicinity of the drive unit 34. The tray carrier 36 is configured to store the disc tray 32 transported to the vicinity of the drive unit 34 at an original position (the tray stack 31A or the tray stack 31B).

In the embodiment, the tray carrier 36 is configured to move in the vertical direction Z. The tray carrier 36 is configured to enable the disc tray 32 is drawn in and out of the tray stack 31A or 31B by moving to a desired position of the disc tray 32.

Figure 7E:
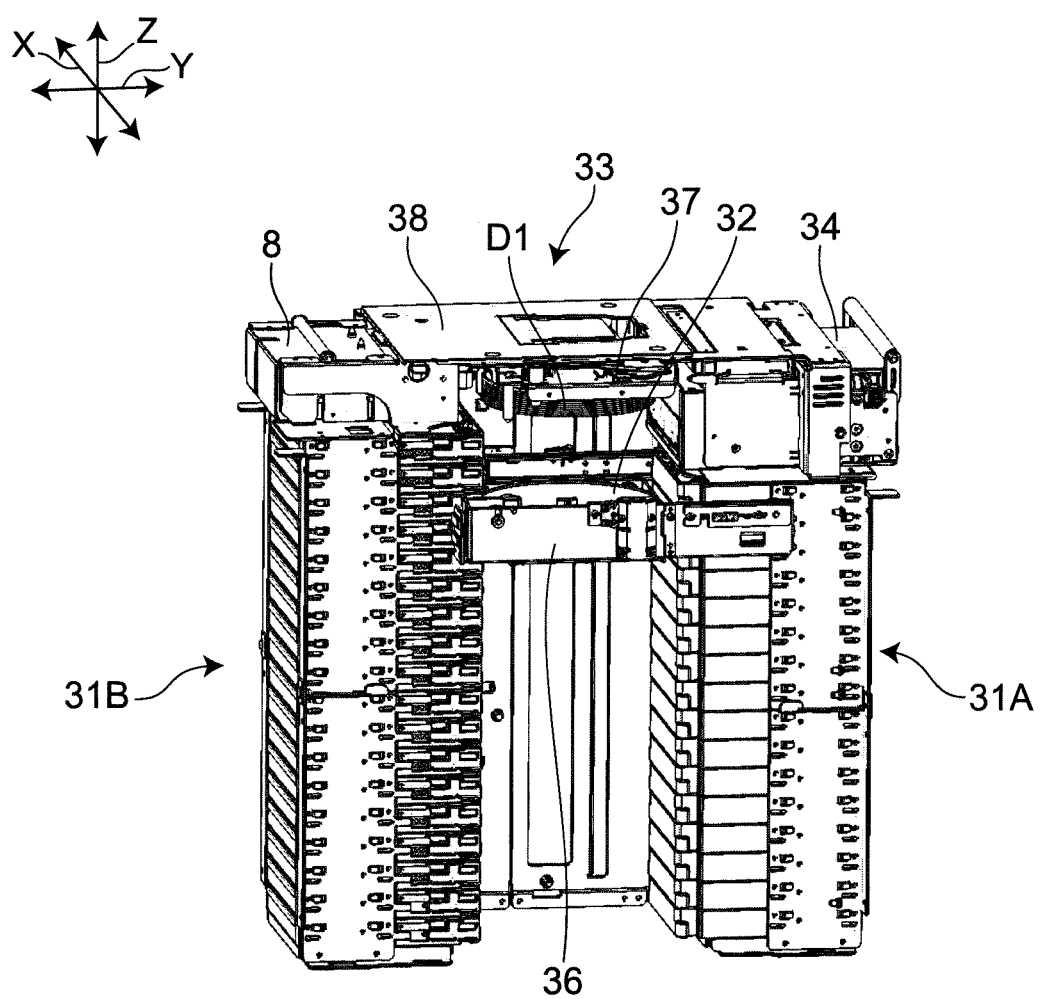
FIG. 7E is a perspective view illustrating the disc transport operation subsequent to FIG. 7D.

The disc selector 37 is disposed in the vicinity of the drive unit 34, and is configured to supply one disc D1 from a plurality of discs D1 stored in the disc tray 32 to the drive unit 34. In the embodiment, as illustrated in FIG. 7E, the disc selector 37 is configured to hold the plurality of discs D1 stored in the disc tray 32 in the vicinity of the drive unit 34. When the disc selector 37 holds the plurality of discs D1, the tray carrier 36 descends, and is separated from the disc selector 37. Thereafter, as illustrated in FIG. 7F, a tray 34A is discharged from the drive unit 34 so as to be located below the disc selector 37.

Figure 7F:
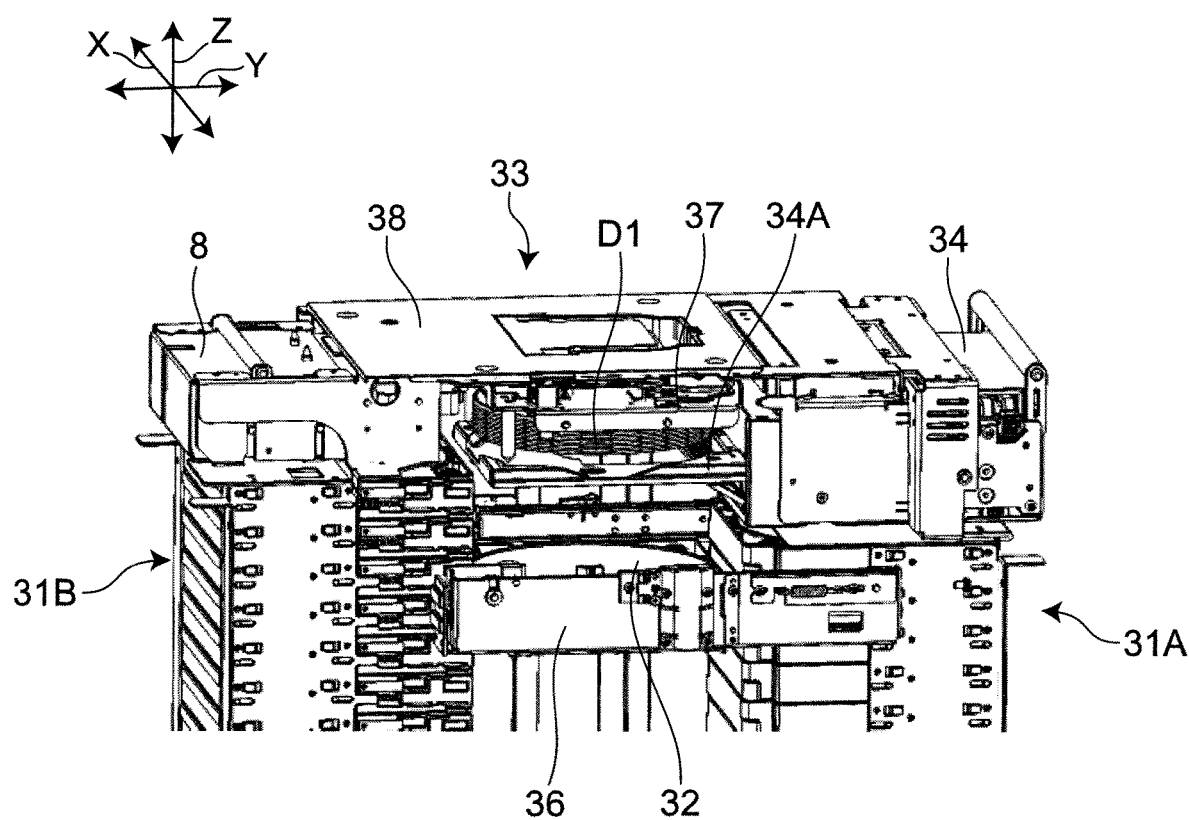
FIG. 7F is a perspective view illustrating the disc transport operation subsequent to FIG. 7E.
Figure 7G:
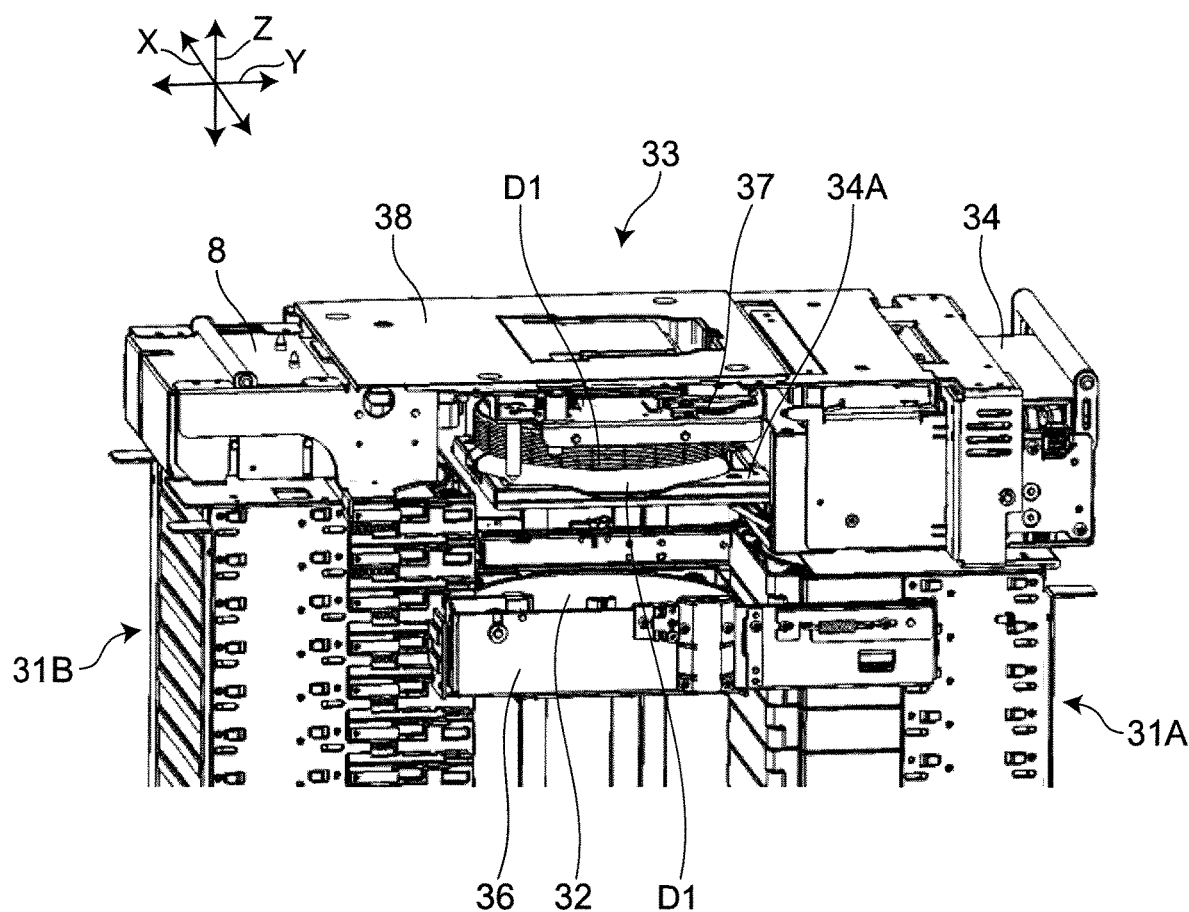
FIG. 7G is a perspective view illustrating the disc transport operation subsequent to FIG. 7F.
Figure 7H:
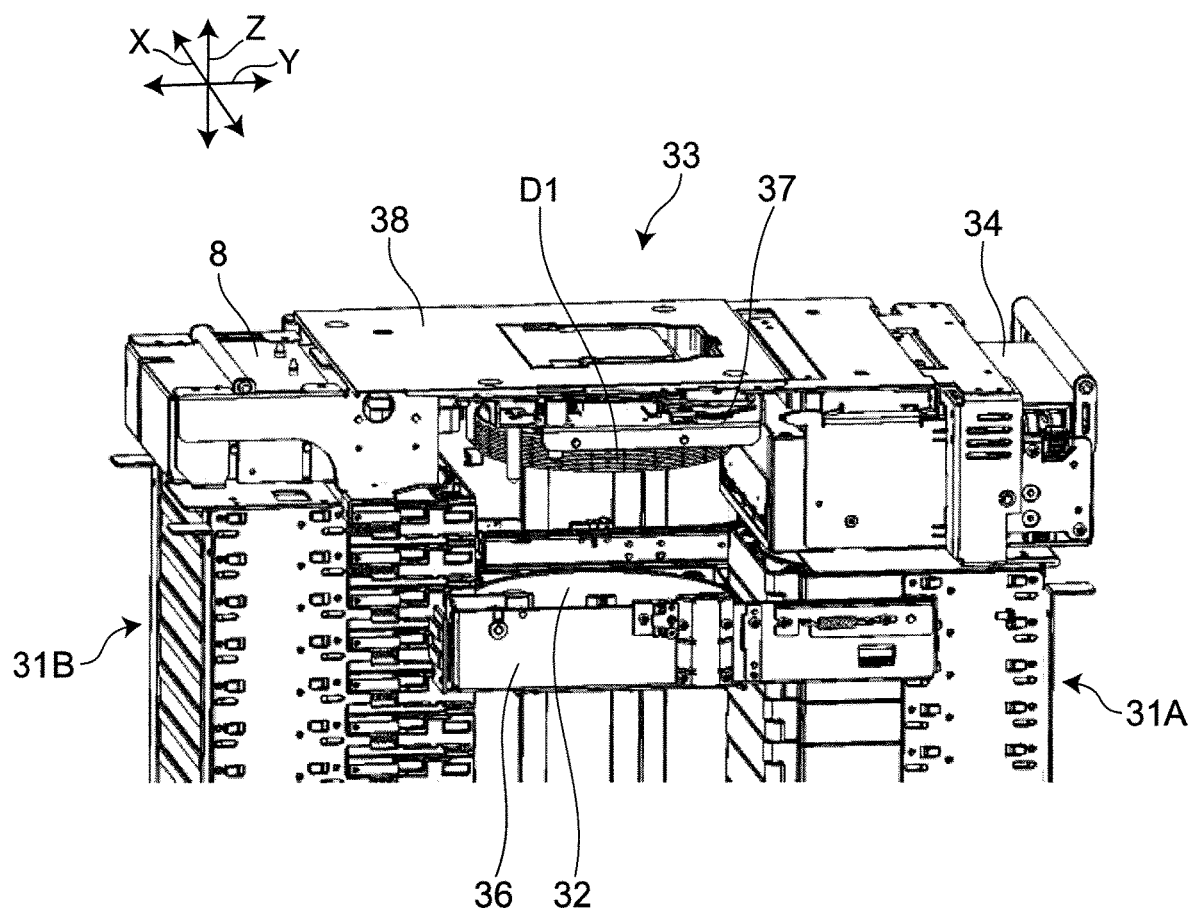
FIG. 7H is a perspective view illustrating the disc transport operation subsequent to FIG. 7G.

As illustrated in FIG. 7G, the disc selector 37 separates one disc D1 from the plurality of held discs D1, and supplies the separated disc D1 to the tray 34A of the drive unit 34. Thereafter, as illustrated in FIG. 7H, the tray 34A is transported into the drive unit 34, and thus, data can be recorded or reproduced on the disc D1.

As illustrated in FIG. 7F, the disc selector 37 is configured to hold the disc D1 on the tray 34A discharged from the drive unit 34 and return the disc D1 into the disc tray 32 by releasing the holding of the disc on the disc tray 32.

Next, a configuration of the disc tray 32 will be described in more detail.

Figure 8:
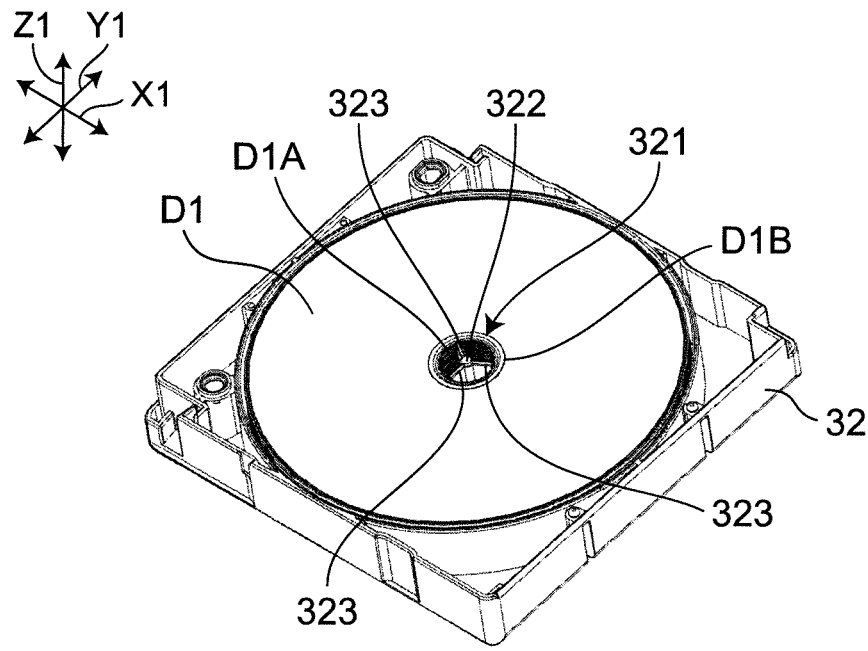
FIG. 8 is a perspective view illustrating a state in which a plurality of discs is stored in a disc tray in a stacked state.
Figure 9:
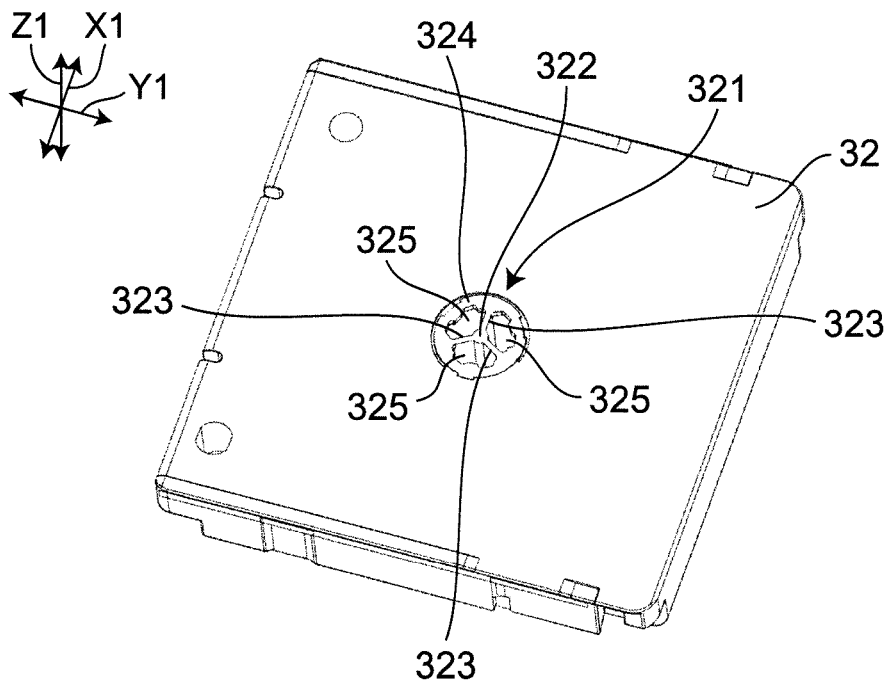
FIG. 9 is a perspective view of the disc tray when viewed obliquely from below.

FIG. 8 is a perspective view illustrating a state in which the plurality of discs D1 is stored in the disc tray 32 in a stacked state. FIG. 9 is a perspective view of the disc tray 32 when viewed obliquely from below.

As illustrated in FIG. 8, a disc tray spindle (also referred to as a core rod) 321 that penetrates a center hole D1A formed in each of the plurality of discs D1 and regulates the movement of each disc D1 in a plane direction (X1 direction and Y1 direction) is provided at the disc tray 32.

The disc tray spindle 321 is made of a material such as polyacetal (POM) having high wear resistance and high slidability. The disc tray spindle 321 is configured to come in contact with an inner peripheral portion D1B of each disc D1 at three points. At least one of the disc tray spindle 321 and each disc D1 may be shaved due to the contact of the disc tray spindle with each disc, and a foreign substance (savings) can be prevented from being generated by such shaving. It is possible to suppress sliding resistance low while stably support the inner peripheral portion D1B of each disc D1. As a result, it is possible to more reliably push out the plurality of discs D1 from the disc tray 32.

In the embodiment, the disc tray spindle 321 includes a central shaft 322 extending in a thickness direction Z1 of the disc tray 32, and three side plates 323 that are connected to the central shaft 322 to come in contact with the inner peripheral portion D1B of each disc D1. In the embodiment, the central shaft 322 is formed in a columnar shape. Each side plate 323 is formed in a flat plate shape, and is connected along a side surface of the central shaft 322.

As illustrated in FIG. 9, three side plates 323 are arranged at substantially equal angular intervals or at equal angular intervals about the central shaft 322 when viewed from the thickness direction Z1 of the disc tray 32. Specifically, three side plates 323 are arranged at intervals of 120 degrees around the central shaft 322. The disc tray spindle 321 comes in contact with the inner peripheral portion D1B of the disc D1 at three points by leading end portions of three side plates 323.

Through-holes 325 in three regions sandwiched between any two side plates 323 of three side plates 323 are formed in the bottom plate 324 of the disc tray 32 when viewed from the thickness direction Z1 of the disc tray 32.

Each through-hole 325 is formed in a region (for example, a region inner side of φ 17.75 mm) located in the vicinity of an inner diameter of the disc D1 when viewed from the thickness direction Z1 of the disc tray 32. A recording region of the disc D1 is, for example, a region where data in a range of 40 mm to 118.5 mm from a center of the disc D1 is recorded.

Next, a configuration of the disc selector 37 will be described in more detail.

FIGS. 10A to 10D are perspective views illustrating scenes in which the disc selector 37 holds the plurality of discs D1 within the disc tray 32 transported by the tray carrier 36.

As illustrated in FIGS. 10A to 10D, the disc selector 37 includes a disc selector spindle 371 inserted into the center hole D1A formed in each of the plurality of discs D1. The disc selector spindle 371 is configured to hold the plurality of discs D1 in the stacked state, separate the lowermost disc of the held discs from the other discs, and supply the separated disc to the drive unit 34.

In the embodiment, the disc selector spindle 371 is configured to hold any number of discs among the plurality of discs D1. FIG. 10B illustrates a state in which the tray carrier 36 ascends to a position at which the disc selector spindle 371 holds the uppermost disc. FIG. 10C illustrates a state in which the tray carrier 36 ascends to a position at which the disc selector spindle 371 holds six discs. FIG. 10D illustrates a state in which the tray carrier 36 ascends to a position at which the disc selector spindle 371 holds all (12) discs.

A disc-shaped disc press 372 is attached around the disc selector spindle 371 so as to be relatively movable in the vertical direction Z. The disc press 372 is urged downward by a conical coil spring 377 (see FIG. 20A). In FIGS. 10A to 10D, the conical coil spring 377 is not illustrated. The conical coil spring 377 is, for example, a 10-turn conical coil spring, and a wire diameter φ of the coil spring is, for example, 0.6 mm. An outer peripheral side of the conical coil spring 377 is held by the disc press 372, and an inner peripheral side of the conical coil spring 377 is held by the disc selector spindle 371. The conical coil spring 377 can be reduced to the wire diameter φ in a state in which the conical coil spring 377 is most compressed in the vertical direction Z. When the disc selector spindle 371 is inserted into the center hole D1A of each disc D1, the disc press 372 presses the disc D1 against the disc tray 32 by an urging force of the conical coil spring 377 by coming in contact with a non-recording region on the inner peripheral portion of the disc D1. Accordingly, each disc D1 is prevented from rattling, and the disc selector spindle 371 is more reliably inserted into the center hole D1A of each disc D1.

The disc selector 37 includes a drive mechanism 9 that drives the disc selector spindle 371, a displacement amount detection mechanism 11A that detects a displacement amount of the disc press 372 caused by holding the disc D1, and a chassis 373 that holds the drive mechanism 9 and the displacement amount detection mechanism 11A.

Figure 11:
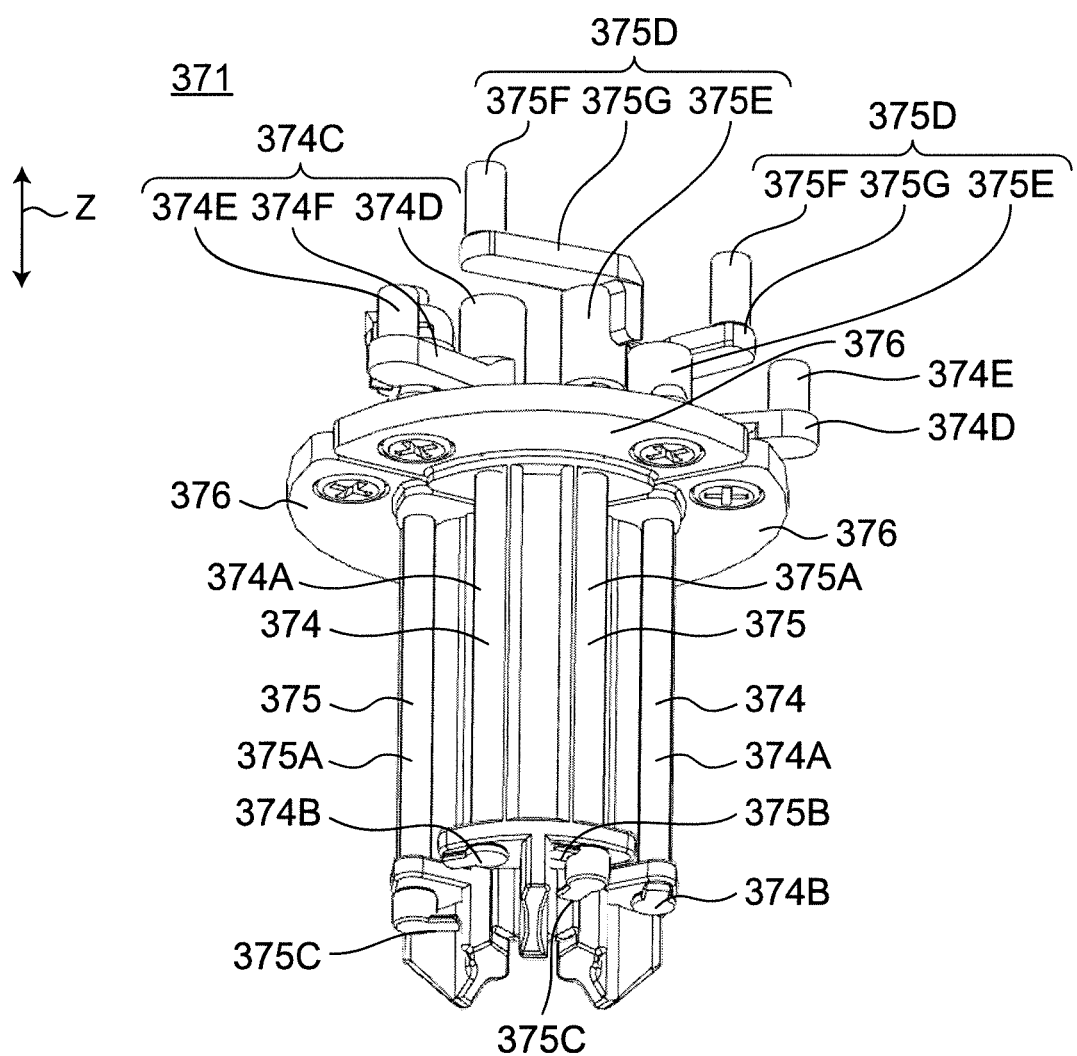
FIG. 11 is a perspective view of the disc selector spindle.

FIG. 11 is a perspective view of the disc selector spindle 371. The disc selector spindle 371 includes a plurality of select hooks 374 and a plurality of drop hooks 375. In the embodiment, the disc selector spindle 371 includes three select hooks 374 and three drop hooks 375.

The select hooks 374 and the drop hooks 375 are attached so as to penetrate fixing plates 376. The fixing plate 376 is a fan-shaped plate member having a central angle of about 120 degrees, and is fixed to the chassis 373 by a fastening member such as a screw. Three fixing plates 376 are attached to the chassis 373 in a disc shape. One select hook 374 and one drop hook 375 are attached to one fixing plate 376. That is, three select hooks 374 and three drop hooks 375 are alternately arranged at intervals in a circumferential direction of the center hole D1A of the disc D1 in plan view.

The select hook 374 and the drop hook 375 attached to each fixing plate 376 are configured to pass through the through-hole 325 of the disc tray 32. In the embodiment, the select hook 374 and the drop hook 375 are configured to relatively move in the vertical direction Z which is a stacking direction of the disc D1.

The select hook 374 includes a first shaft 374A extending in the vertical direction Z which is the stacking direction of the disc D1, the first support claw 374B attached to a lower end portion of the first shaft 374A, and a selection lever 374C attached to an upper end portion of the first shaft 374A.

The first shaft 374A is a columnar member, and is attached to the fixing plate 376 so as to be rotatable around an axis.

The first support claw 374B is configured to move to a storage position at which the first support claw is stored inside the center hole D1A of the disc D1 and a protrusion position at which the first support claw protrudes in the region located in the vicinity of the inner diameter of the disc D1 in plan view. In the embodiment, the first support claw 374B is configured to move between the storage position and the protrusion position in conjunction with the rotation operation of the first shaft 374A around an axis. The first support claw 374B is configured to pass through the through-hole 325 of the disc tray 32 in a state in which the first support claw is located at the protrusion position.

The selection lever 374C includes a fixing pin 374D and an engagement pin 374E extending in the vertical direction Z, and a connection bar 374F that connects the fixing pin 374D and the engagement pin 374E. The fixing pin 374D and the engagement pin 374E are columnar members each having a diameter larger than a diameter of the first shaft 374A. The fixing pin 374D is disposed coaxially with the first shaft 374A, and is formed to protrude upward from the connection bar 374F. The engagement pin 374E is arranged at a position shifted laterally with respect to the first shaft 374A, and is formed to protrude upward from the connection bar 374F.

The drop hook 375 has a second shaft 375A extending in the vertical direction Z which is the stacking direction of the disc D1, a second support claw 375B and a third support claw 375C attached to a lower end portion of the second shaft 375A, and a separation lever 375D attached to an upper end portion of the second shaft 375A.

The second shaft 375A is a columnar member, and is attached to the fixing plate 376 so as to be rotatable around an axis.

The second support claw 375B is configured to move to a storage position at which the second support claw is stored inside the center hole D1A of the disc D1 and a protrusion position at which the second support claw protrudes in the region located in the vicinity of the inner diameter of the disc D1 in plan view. The third support claw 375C is configured to move to a storage position at which the third support claw is stored inside the center hole D1A of the disc D1 and a protrusion position at which the third support claw protrudes in the region located in the vicinity of the inner diameter of the disc D1 in plan view. In the embodiment, the second support claw 375B and the third support claw 375C are configured to move to one storage position and one protrusion position in conjunction with the rotation operation of the second shaft 375A around an axis. The first support claw 374B, the second support claw 375B, and the third support claw 375C are configured to move to the storage position and the protrusion position independently of each other.

In the embodiment, the second support claw 375B is disposed so as to be shifted upward from the third support claw 375C by the thickness of one disc D1 in the vertical direction Z which is the stacking direction of the disc D1.

A timing when the second support claw 375B moves to the protrusion position from the storage position is different from a timing when the third support claw 375C moves to the protrusion position from the storage position. In the embodiment, the second support claw 375B is provided at a position shifted by a predetermined angle (for example, 90 degrees) with respect to the third support claw 375C when viewed from the vertical direction Z. The second support claw 375B and the third support claw 375C are configured to pass through the recess 325A of the through-hole 325 of the disc tray 32 in a state in which the second and third support claws are located at the protrusion positions.

The separation lever 375D includes a columnar contact pin 375E and a columnar engagement pin 375F extending in the vertical direction Z, and a connection bar 375G that connects the contact pin 375E and the engagement pin 375F. The contact pin 375E is disposed coaxially with the second shaft 375A, and is formed to protrude upward and downward from the connection bar 375G. The engagement pin 375F is disposed at a position shifted laterally with respect to the second shaft 375A, and is formed to protrude upward from the connection bar 375G.

Figure 12:
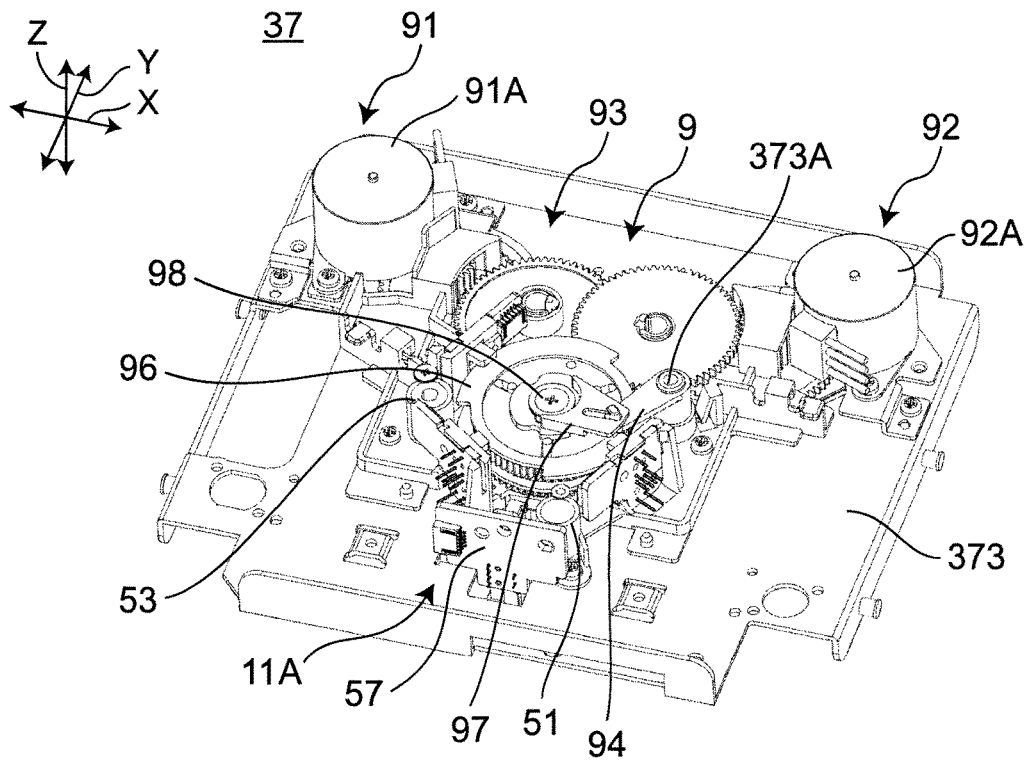
FIG. 12 is a perspective view of the disc selector when viewed obliquely from above.
Figure 13:
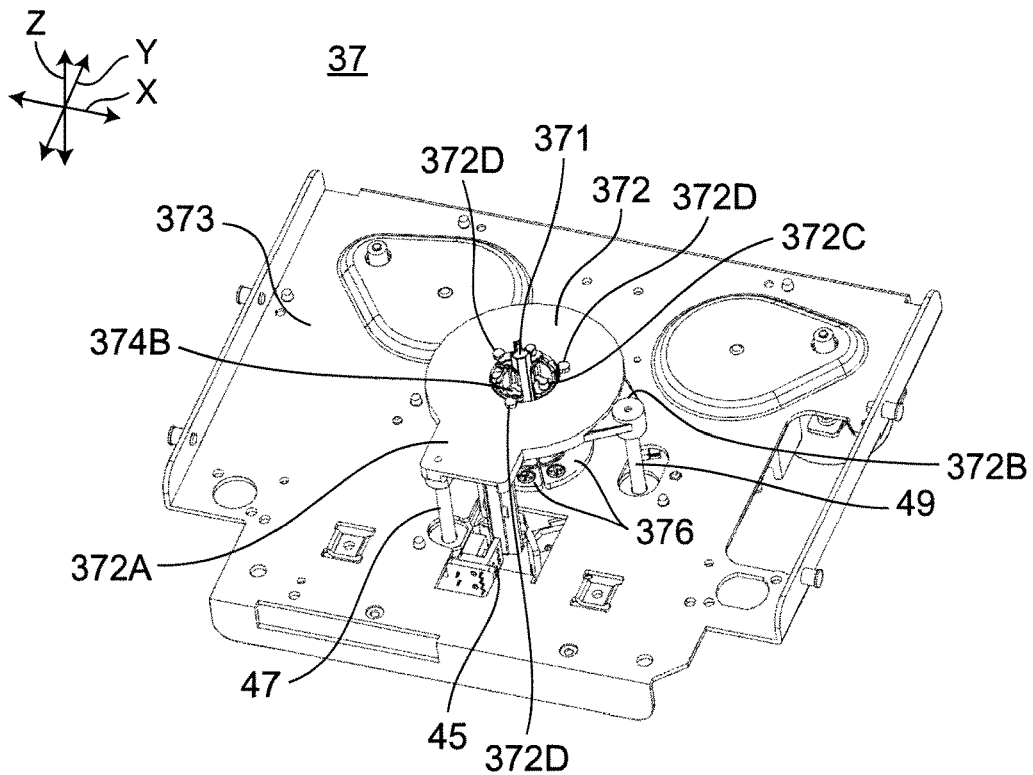
FIG. 13 is a perspective view of the disc selector when viewed obliquely from below.
Figure 14:
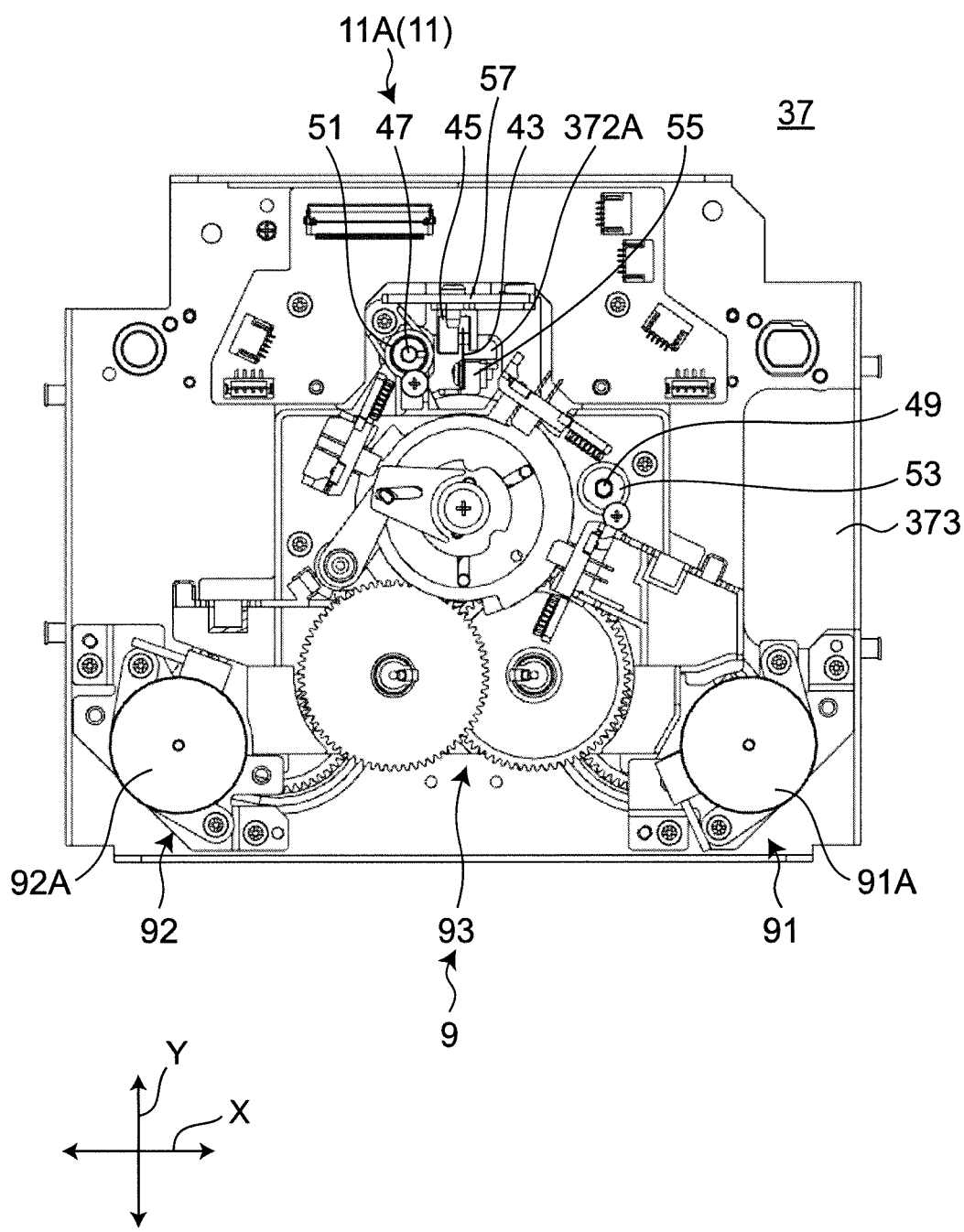
FIG. 14 is a plan view of the disc selector when viewed from above.

FIG. 12 is a perspective view of the disc selector 37 when viewed obliquely from above. FIG. 13 is a perspective view of the disc selector 37 when viewed obliquely from below. FIG. 14 is a plan view of the disc selector when viewed from above.

As illustrated in FIG. 12, the drive mechanism 9 is attached on an upper surface of the chassis 373. The drive mechanism 9 includes a select hook drive unit 91, a drop hook drive unit 92, and a cam mechanism 93.

The select hook drive unit 91 includes a selection motor 91A and a gear. The select hook 374 rotates in conjunction with the rotation of the selection motor 91A. The driving of the selection motor 91A is controlled by the control unit 7.

The drop hook drive unit 92 includes a separation motor 92A and a gear. The drop hook 375 rotates in conjunction with the rotation of the separation motor 92A. The driving of the separation motor 92A is controlled by the control unit 7.

Figure 15:
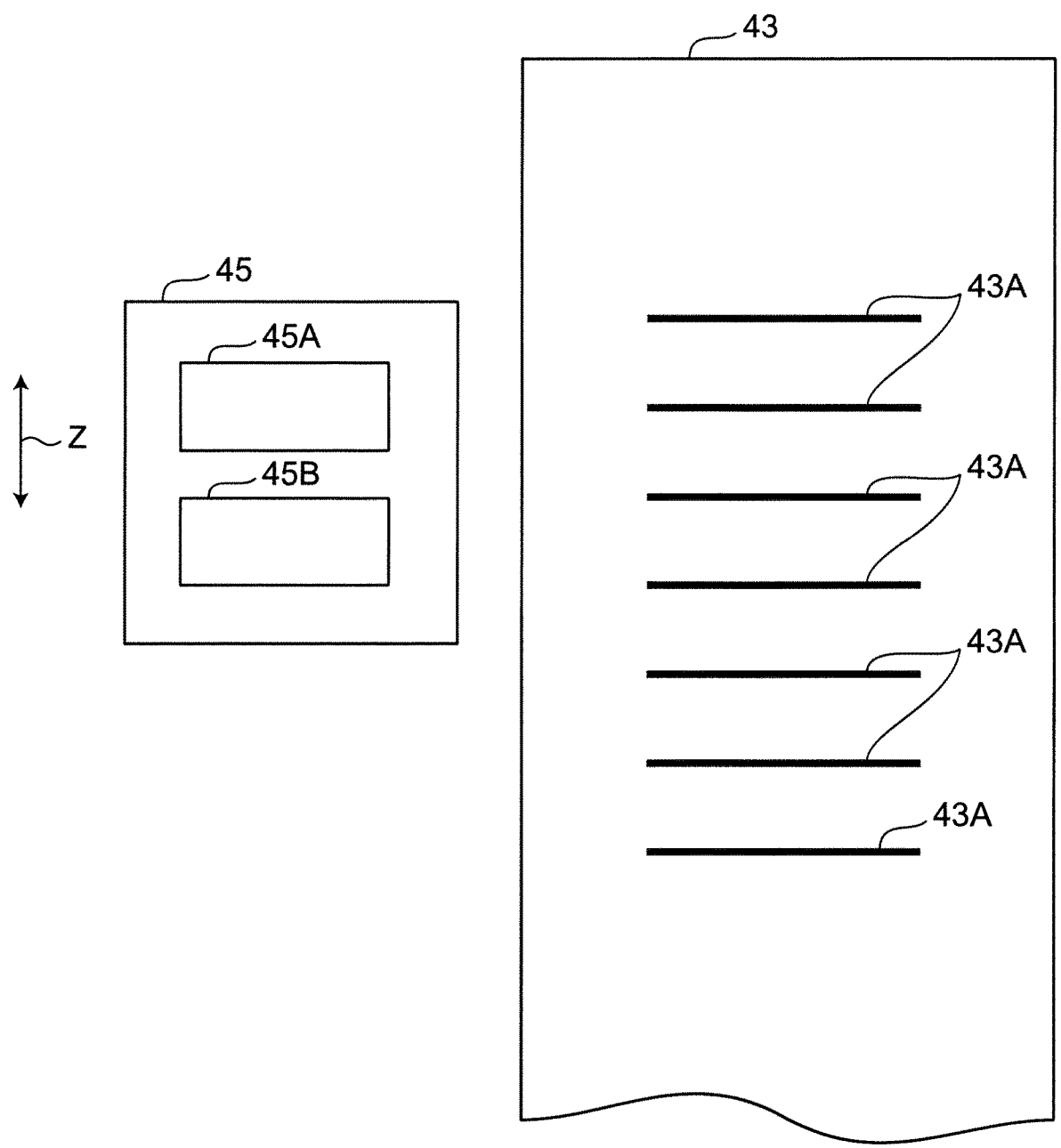
FIG. 15 is an explanatory diagram illustrating a positional relationship between a sheet and an encoder.
Figure 16:
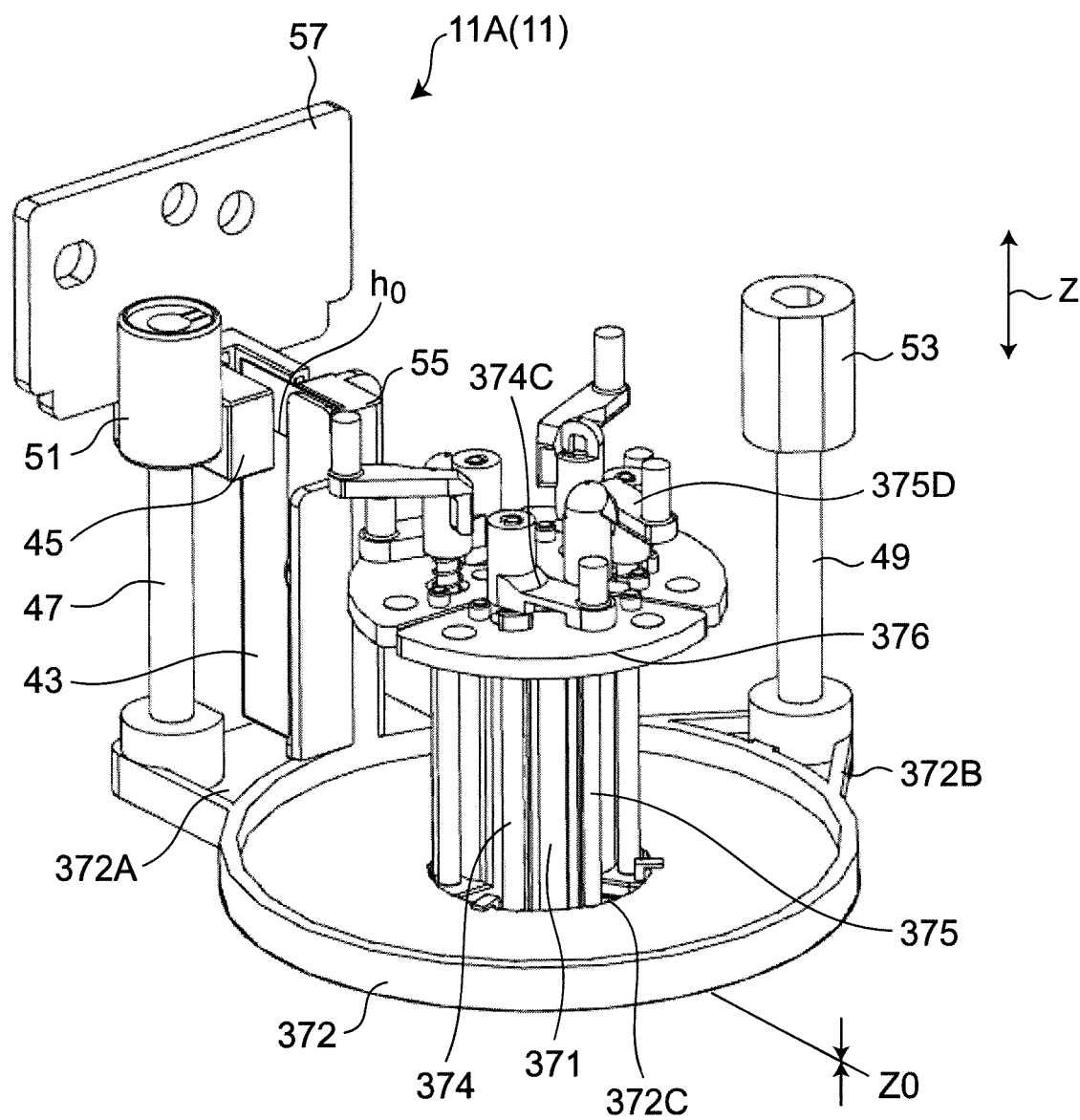
FIG. 16 is a perspective view of a displacement detection mechanism of the disc selector in FIG. 10A when viewed obliquely from above.

As illustrated in FIGS. 14 to 16, a thickness detection unit 11 includes the displacement amount detection mechanism 11A that detects the displacement amount of the disc press 372 displaced according to thicknesses of the plurality of discs D1 supported by the disc selector 37, and a thickness detection unit 11B (see FIG. 6) that detects a thickness of each of the plurality of discs D1 based on the detected displacement amount of the disc press 372. The displacement amount detection mechanism 11A includes a sheet 43 having slits formed at equal intervals, an encoder 45 that counts the number of slits formed in the sheet 43, a first disc press shaft 47 connected to the disc press 372, and a second disc press shaft 49. The displacement amount detection mechanism 11A includes a main guide 51 that guides the first disc press shaft 47 and a sub-guide 53 that guides the second disc press shaft 49. The control unit 7 functions as the thickness detection unit 11B.

The sheet 43 as a film is attached to a column 55 that extends vertically upward (Z direction) from an upper surface of the disc press 372 along a side part in a longitudinal direction. Therefore, the sheet 43 is vertically displaced with a vertical movement of the disc press 372. As illustrated in FIG. 15, slits 43A extending in a horizontal direction are formed in the sheet 43 at equal intervals in the vertical direction. The interval between the adjacent slits 43A is, for example, 0.07 mm. The sheet 43 is made of resin, for example, polyethylene terephthalate (PET).

The encoder 45 detects a displacement amount of the sheet 43 by counting the number of slits 43A of the sheet 43 that moves up and down. The encoder 45 includes two optical elements 45A and 45B, and the optical elements 45A and 45B are arranged at intervals in the vertical direction Z. For example, the optical elements 45A and 45B are photo interrupters each including a light emitting element (light emitting diode) and a light receiving element (phototransistor). A phase of a detection signal of the slit 43A can be shifted by providing two optical elements 45A and 45B, and a movement direction of the slit 43A can be detected. The displacement amount of the sheet 43 can be detected with a resolution twice the interval between the slits.

The encoder 45 is supported by an encoder support plate 57. The encoder support plate 57 is supported by the chassis 373. As illustrated in FIG. 13, the disc press 372 has a through-hole 372C through which the disc selector spindle 371 is inserted. Projections 372D that protrude downward and come in contact with an upper surface of a non-recording region on the inner peripheral portion of the disc D1 are formed in a lower surface of the disc press 372. For example, three projections 372D are formed in the lower surface of the disc press 372, and the projections 372D are arranged at substantially equal angular intervals or at equal angular intervals around the through-hole 372C.

Figure 10A:
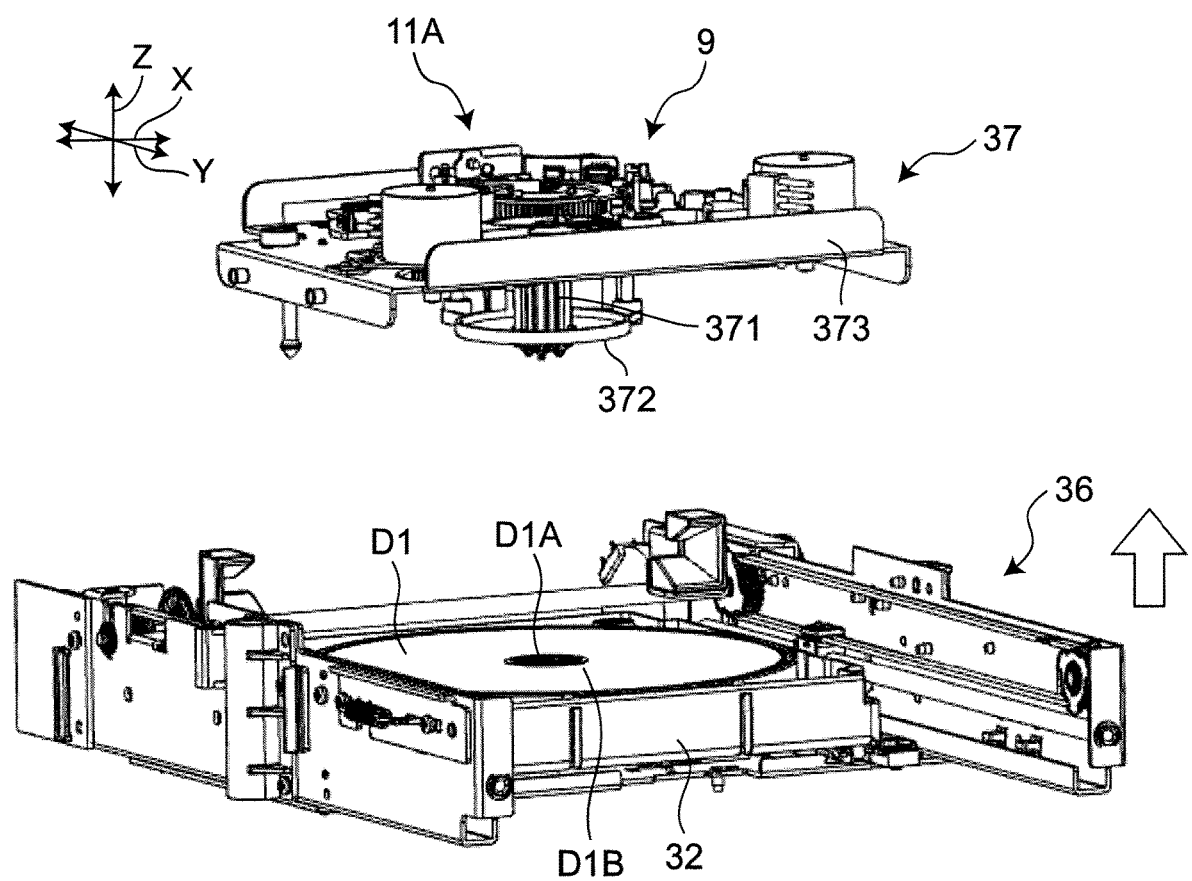
FIG. 10A is a perspective view illustrating a scene in which the tray carrier holds the plurality of discs within the disc tray transported by a disc selector.
Figure 10B:
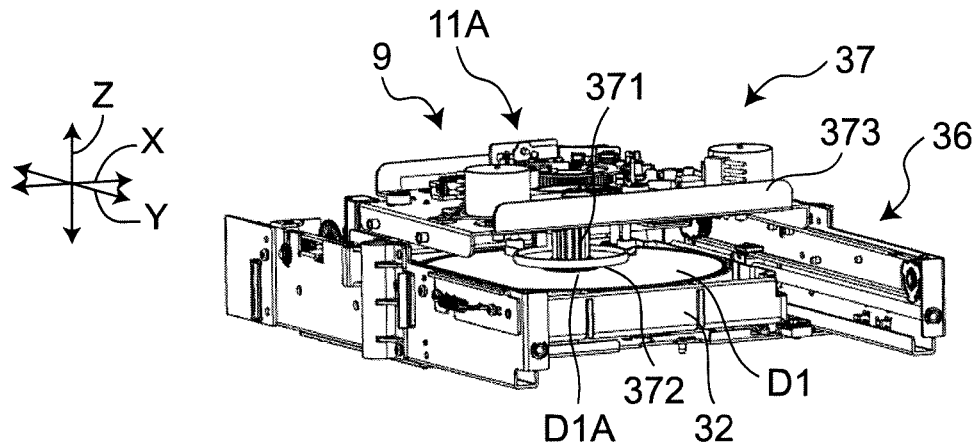
FIG. 10B is a perspective view illustrating a state in which the tray carrier ascends to a position at which the disc selector spindle holds the uppermost disc.
Figure 10C:
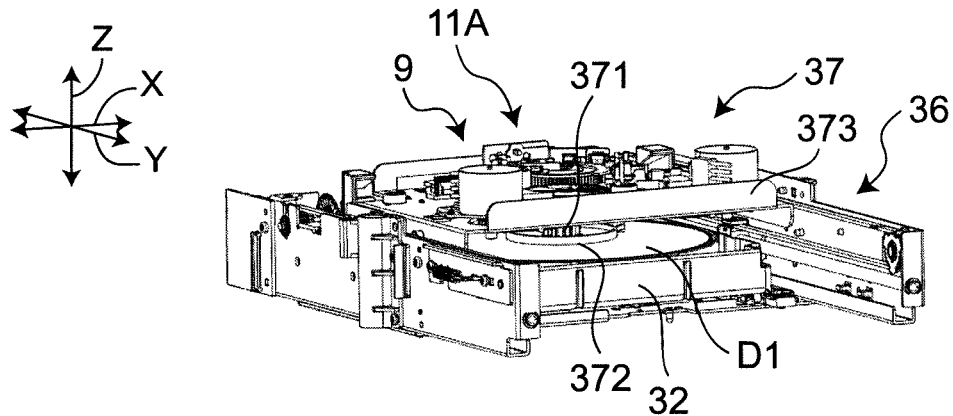
FIG. 10C is a perspective view illustrating a state in which the tray carrier ascends to a position at which the disc selector spindle holds six discs.
Figure 10D:
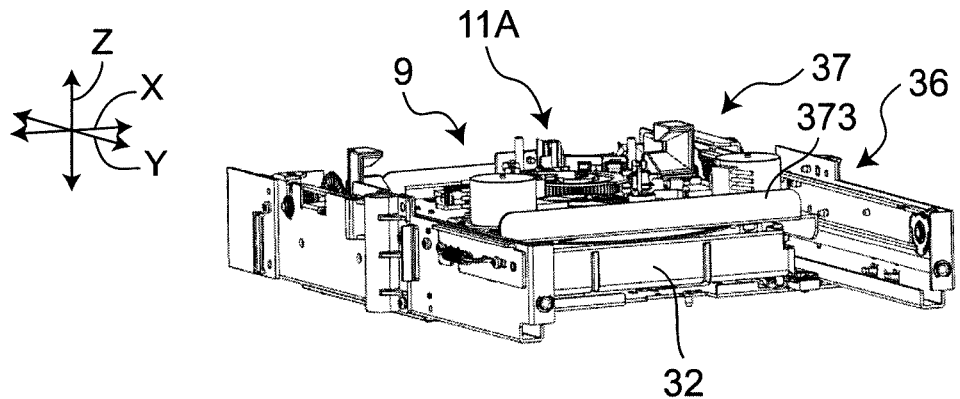
FIG. 10D is a perspective view illustrating a state in which the tray carrier ascends to a position at which the disc selector spindle holds all the discs.

FIG. 16 is a perspective view illustrating the displacement amount detection mechanism 11A of the disc selector 37 of FIG. 10A. The first disc press shaft 47 and the column 55 are connected to a rectangular first extension portion 372A that extends outward from an outer periphery of the disc press 372. The first disc press shaft 47 extends vertically upward with respect to the disc press 372 in parallel with the column 55. The first disc press shaft 47 is inserted into the cylindrical main guide 51 having a hole formed in the vertical direction Z.

The second disc press shaft 49 is connected to a substantially triangular second extension 372B extending outward from the outer periphery of the disc press 372. The second disc press shaft 49 extends vertically upward with respect to the disc press 372 in parallel with the column 55. The second disc press shaft 49 is inserted through the cylindrical sub-guide 53 having a hole formed in the vertical direction Z. The main guide 51 and the sub-guide 53 serving as guides are supported by the chassis 373.

Since the first disc press shaft 47 and the column 55 are arranged close to each other, the rattling of the vertical movement of the sheet 43 can be reduced, and the detection accuracy of the slit 43A can be improved.

FIG. 16 illustrates a state before the top surface of the plurality of discs D1 abuts on the lower surface of the disc press 372. This state is defined as an initial position at which the displacement amount of the disc press 372 is zero. A displacement amount Z0 of the disc press 372 at the initial position is zero. A height of the sheet 43 with respect to a reading position of the optical element 45B at the initial position is defined as $h_0$. At the initial position, an upper surface of the first support claw 374B of the select hook 374 is at the same height as the lower surface of the disc press 372.

Figure 17:
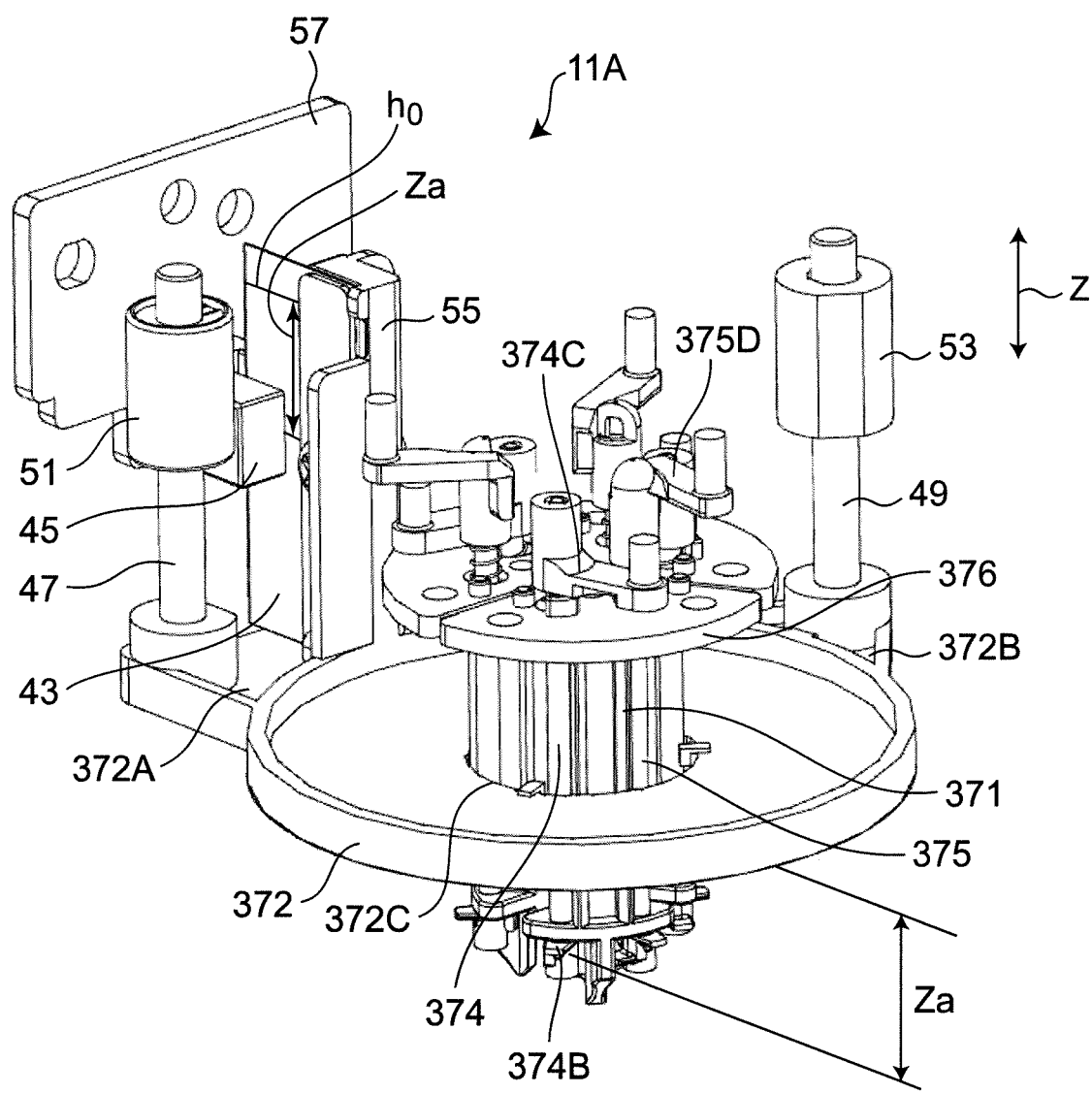
FIG. 17 is a perspective view of the displacement detection mechanism of the disc selector lifted by the disc press of FIG. 16 when viewed obliquely from above.

When the disc tray 32 ascends with respect to the disc selector 37, the upper surface of the uppermost disc D1 of the discs D1 stacked on the disc tray 32 abuts on the disc press 372 of the disc selector 37. When the disc tray 32 further ascends, the disc press 372 ascends while being lifted by the uppermost disc D1 as illustrated in FIG. 17. A distance Za from the lower surface of the disc press 372 to the upper surface of the first support claw 374B of the select hook 374 is the same as a displacement amount Za from the height $h_0$ of the initial position which is detected by the encoder 45.

Figure 18:
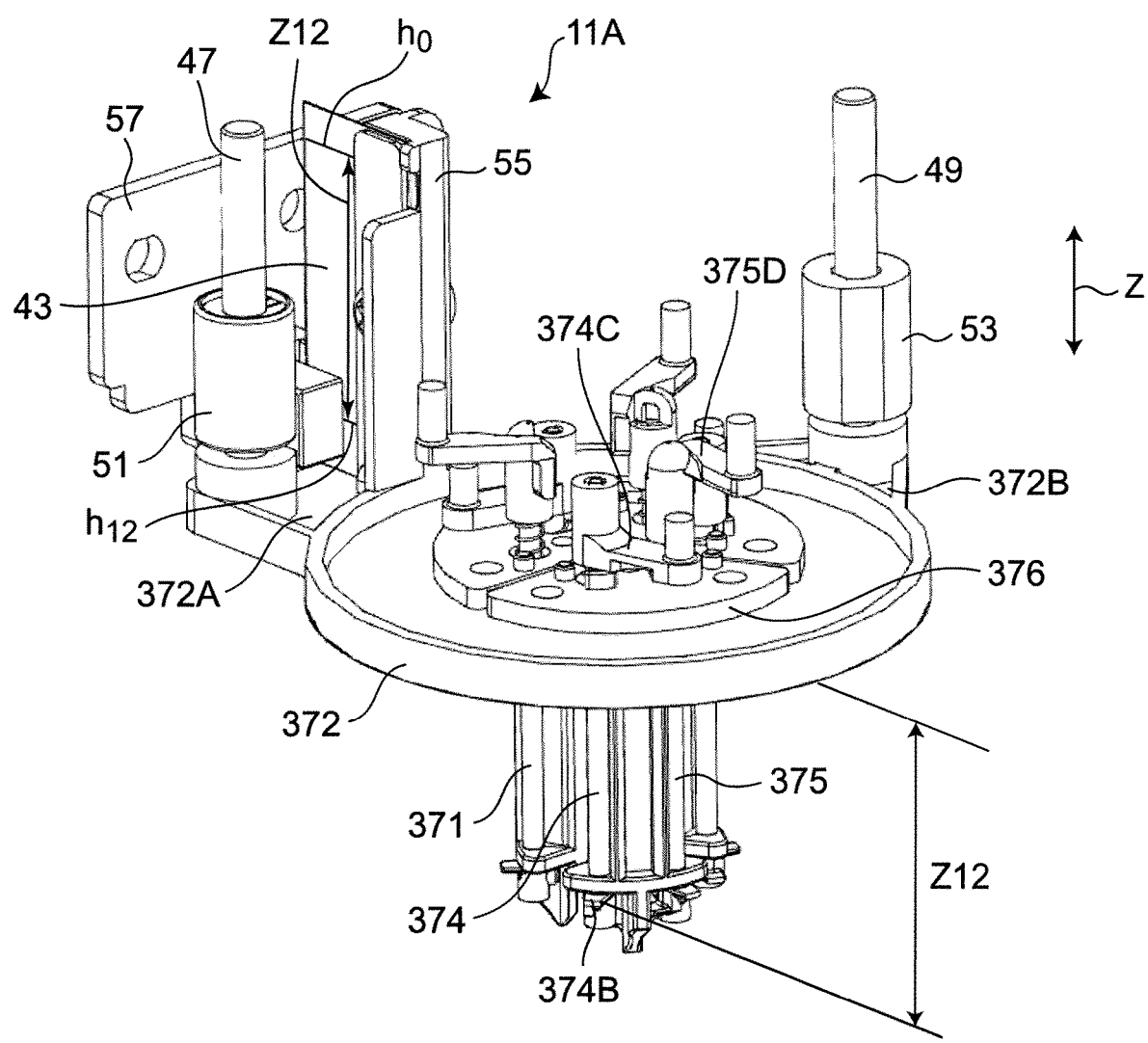
FIG. 18 is a perspective view of the displacement detection mechanism of the disc selector in FIG. 10D when viewed from obliquely above.

FIG. 18 is a perspective view illustrating the displacement amount detection mechanism 11A of the disc selector 37 of FIG. 10D. Although the disc D1 is not illustrated in FIG. 18, the select hook 374 is suspending all twelve discs D1. At this time, a distance Z12 from the lower surface of the disc press 372 to the upper surface of the first support claw 374B of the select hook 374 is detected as a displacement amount Z12 from the height h0 of the initial position which is detected by the encoder 45. At this time, the height of the sheet 43 with respect to the reading position of the optical element 45B is defined as $h_{12}$.

Figure 19:
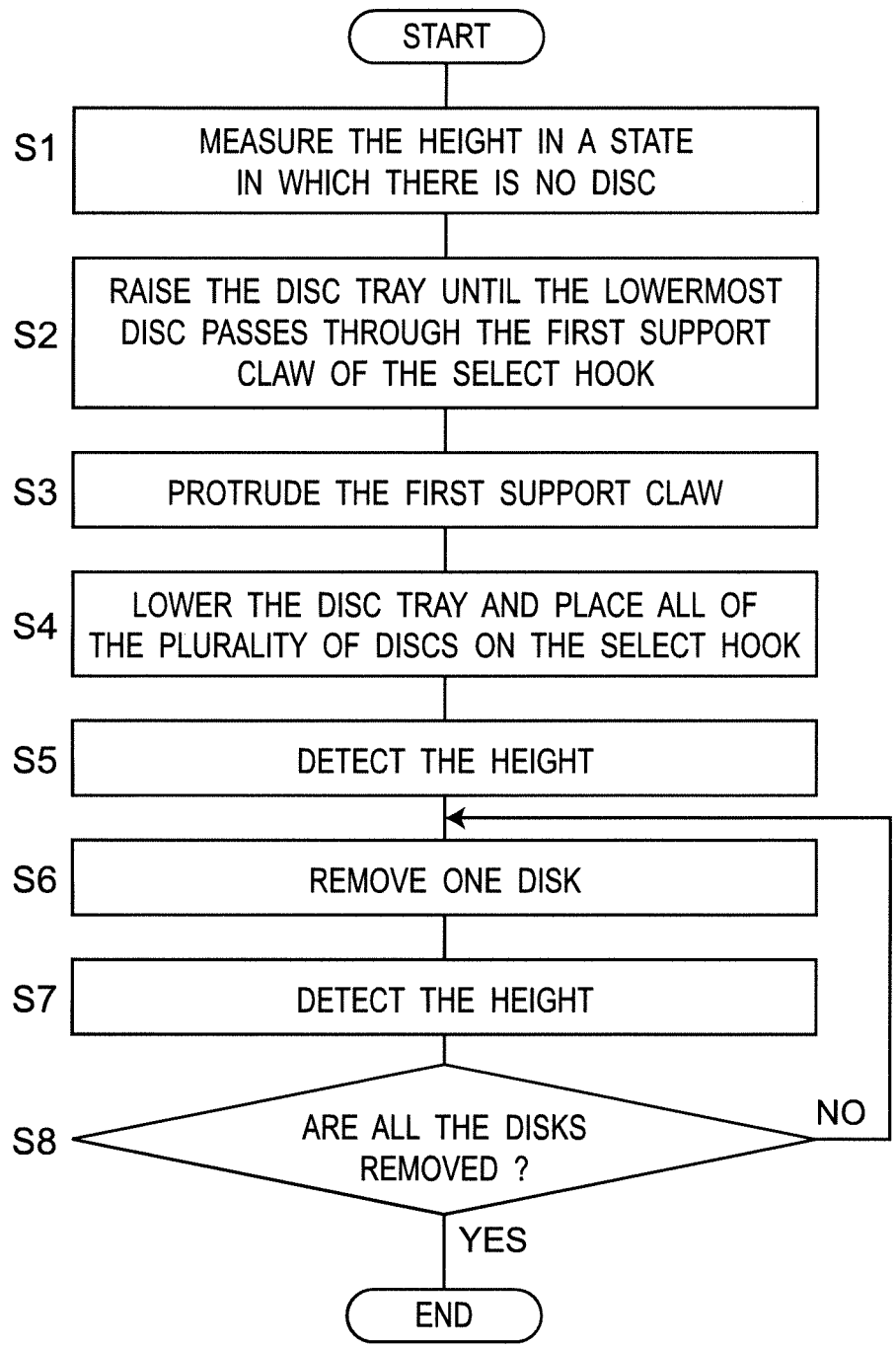
FIG. 19 is a flowchart illustrating a flow of measuring a thickness of the disc.

Next, a method of measuring the thickness of the disc D1 will be described with reference to FIG. 19. FIG. 19 is a flowchart illustrating a flow of measuring the thickness of the disc D1. The thickness of the disc D1 is measured when the disc device 3 is shipped or a new disc tray 32 is attached to the disc device 3. When the operator instructs the disc device 3 to start measuring the disc D1, the control unit 7 starts measuring the thickness of the disc D1 in each of the disc trays 32 stored in the tray stacks 31A and 31B.

Figure 20A:
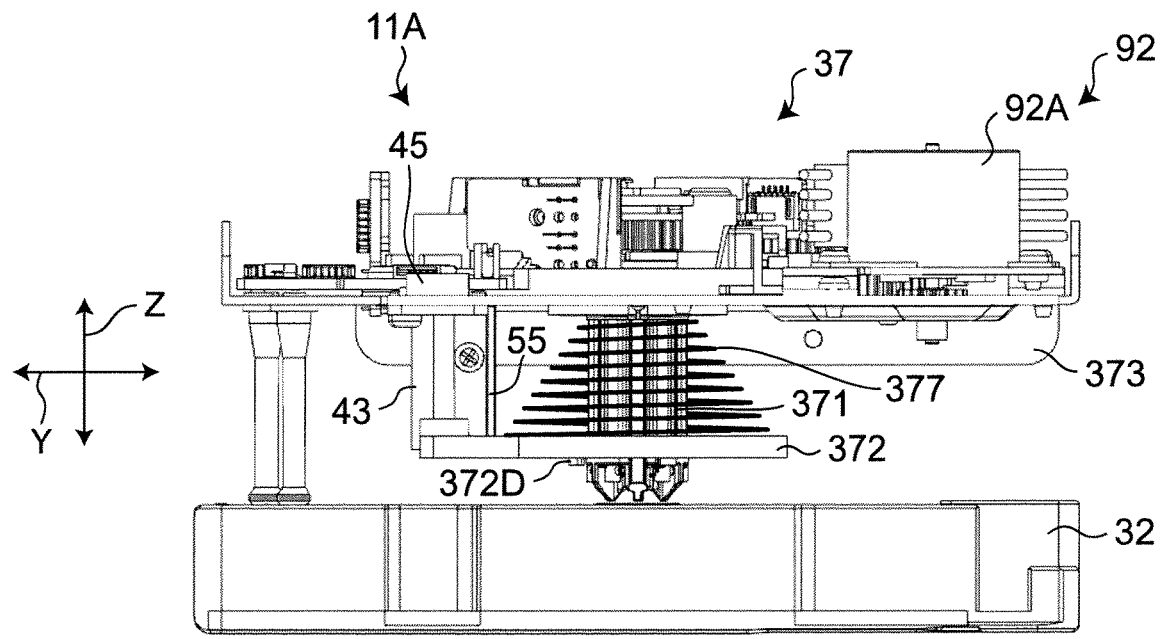
FIG. 20A is a side view of the disc tray and the disc selector at an initial position.
Figure 20B:
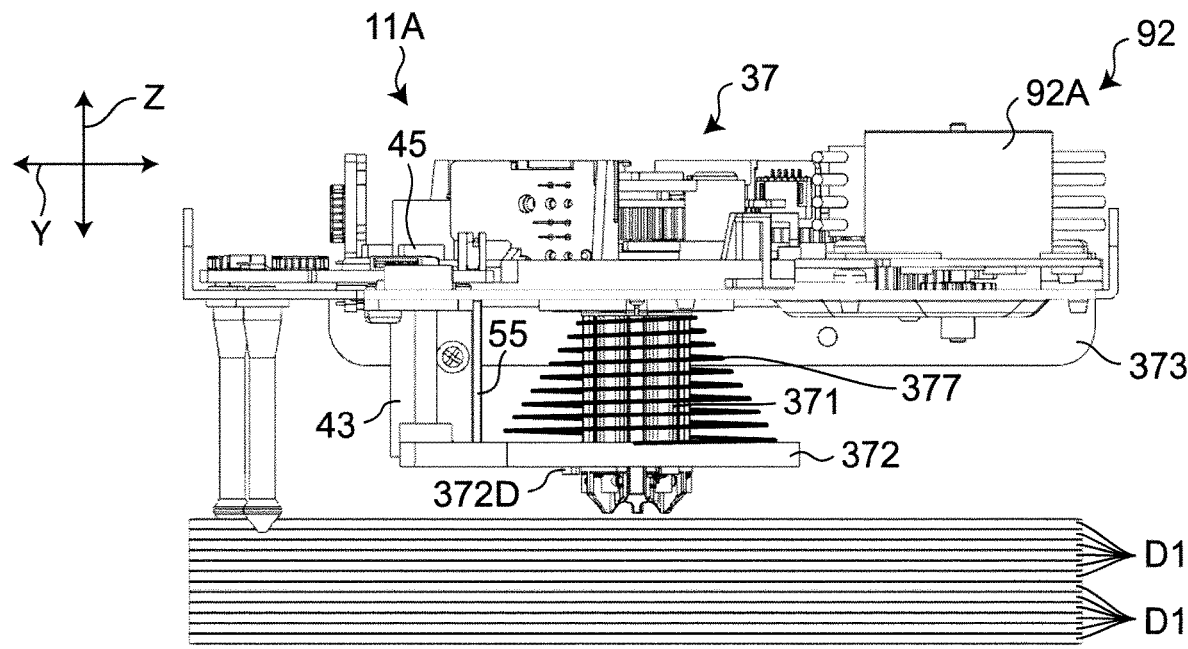
FIG. 20B is a side view of the disc and the disc selector in a state in which the disc tray is omitted at the initial position.

In step S1, when the disc tray 32 does not ascend yet with respect to the disc selector 37, a height of the first support claw 374B of the select hook 374 with respect to the disc tray 372 is measured from the displacement amount of the disc tray 372 in a state in which the top surface of the plurality of discs D1 stacked on the disc tray 32 does not come in contact with the disc press 372 (at the initial position of the disc selector 37). At this time, when the displacement amount Z0 is not zero, the counted value of the encoder 45 is initialized to zero. FIG. 20A is a side view of the disc tray 32 and the disc selector 37 at the initial position. FIG. 20B is a side view of the disc and the disc selector 37 at the initial position in a state in which the disc tray 32 is omitted. After the height of the first support claw 374B is measured in a state in which there is no disc, the control unit 7 instructs the tray carrier 36 to transport the disc tray 32 to the disc selector 37.

Figure 21A:
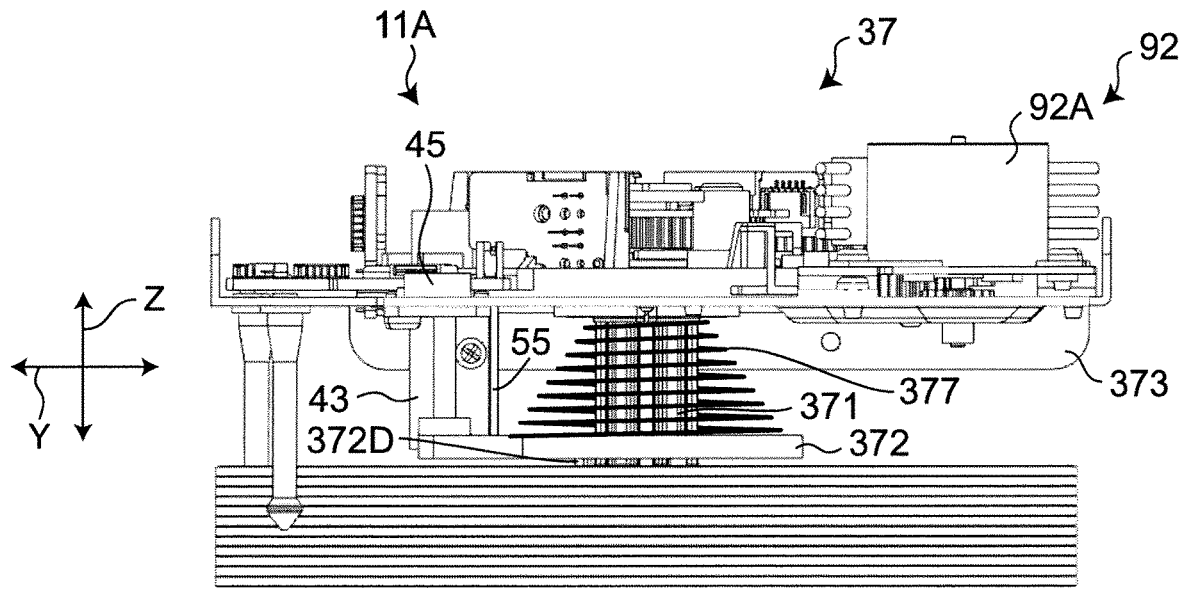
FIG. 21A is a side view of the disc and the disc selector in a state in which the disc tray is omitted when an upper surface of the uppermost disc comes in contact with the disc press.
Figure 21B:
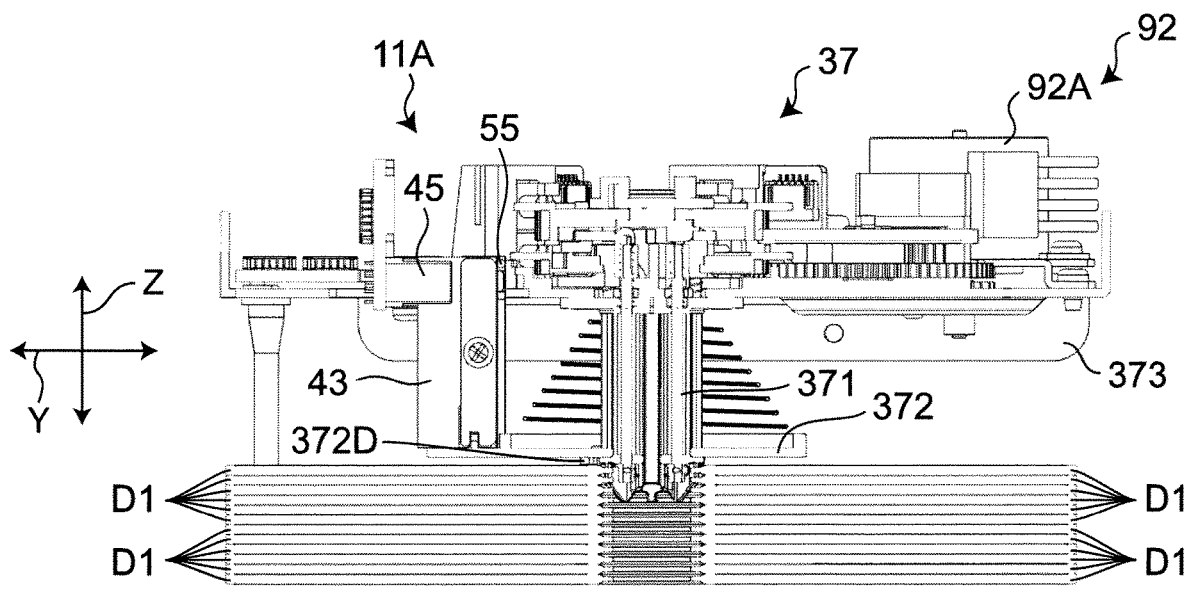
FIG. 21B is a cross-sectional view of the disc and the disc selector in a state in which the disc tray is omitted when the upper surface of the uppermost disc comes in contact with the disc press.

Subsequently, in step S2, the tray carrier 36 raises the disc tray 32 until the lowermost disc D1 of the plurality of discs D1 stacked on the disc tray 32 passes through the first support claw 374B of the select hook 374. As illustrated in FIGS. 21A and 21B, when the disc tray 32 is raised, the disc tray 372 moves upward by bringing the upper surface of the uppermost disc D1 of the plurality of discs D1 stacked on the disc tray 32 into contact with the projections 372D formed in the lower surface of the disc press 372. FIG. 21A is a side view of the disc and the disc selector 37 in a state in which the disc tray 32 is omitted when the upper surface of the uppermost disc D1 comes in contact with the disc press 372. FIG. 21B is a cross-sectional view of the disc and the disc selector 37 in a state in which the disc tray 32 is omitted when the upper surface of the uppermost disc D1 comes into contact with the disc press 372.

Since the sheet 43 moves with the movement of the disc press 372, the encoder 45 counts the number of slits 43A passing upward. The disc tray 32 ascends from when the number of slits 43A is counted to when the counted number reaches a predetermined count number. The predetermined count number is a number corresponding to a distance obtained by adding, for example, 1 mm to all the thicknesses of the plurality of discs D1 stacked on the disc tray 32. At this time, all the thicknesses of the plurality of discs D1 are set by using, for example, the maximum thickness of the disc D1.

Figure 22A:
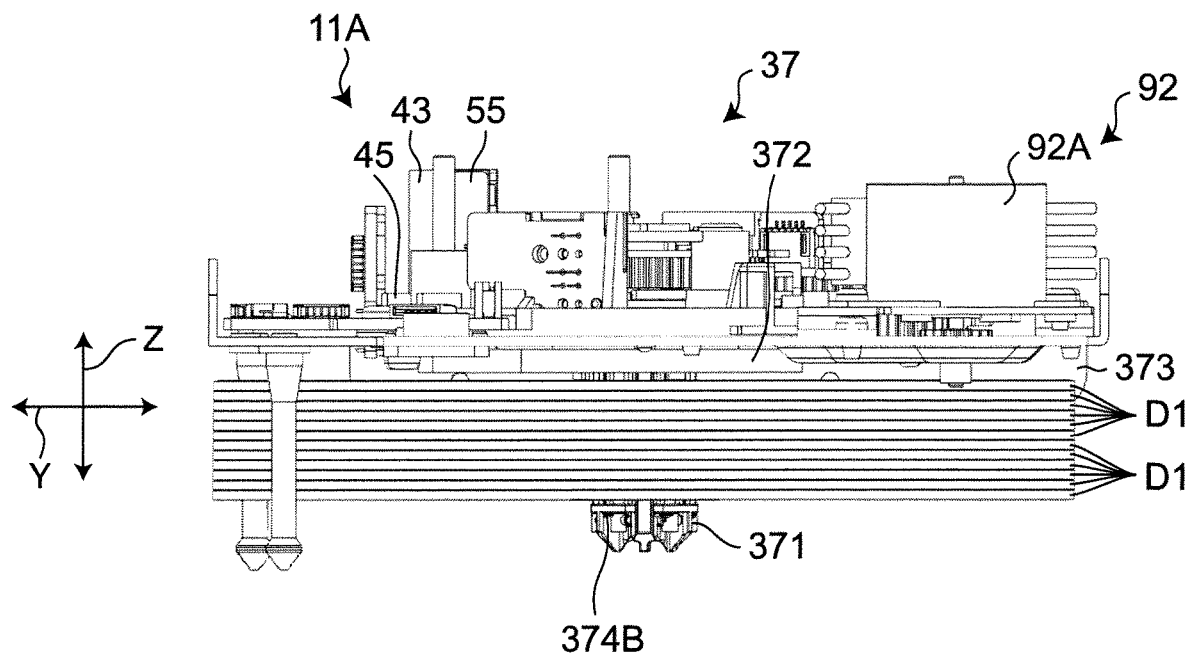
FIG. 22A is a side view illustrating a state in which a first support claw of the disc selector spindle is located below the lowermost disc.
Figure 22B:
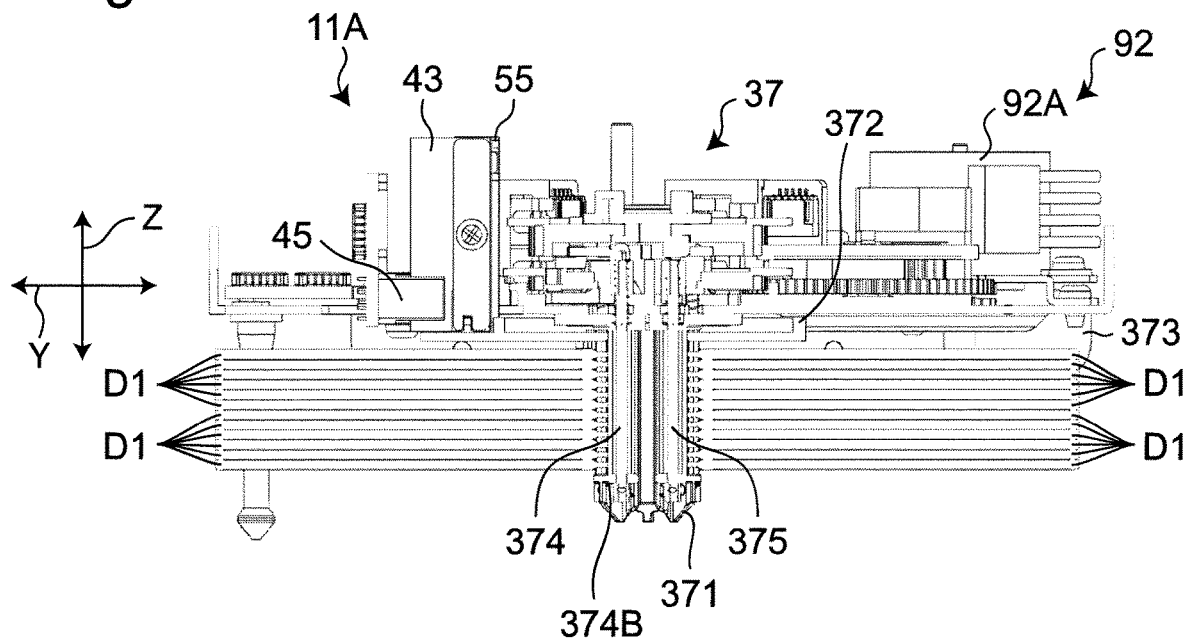
FIG. 22B is a side view illustrating a state in which the first support claw of the disc selector spindle is located below the lowermost disc.
Figure 23:
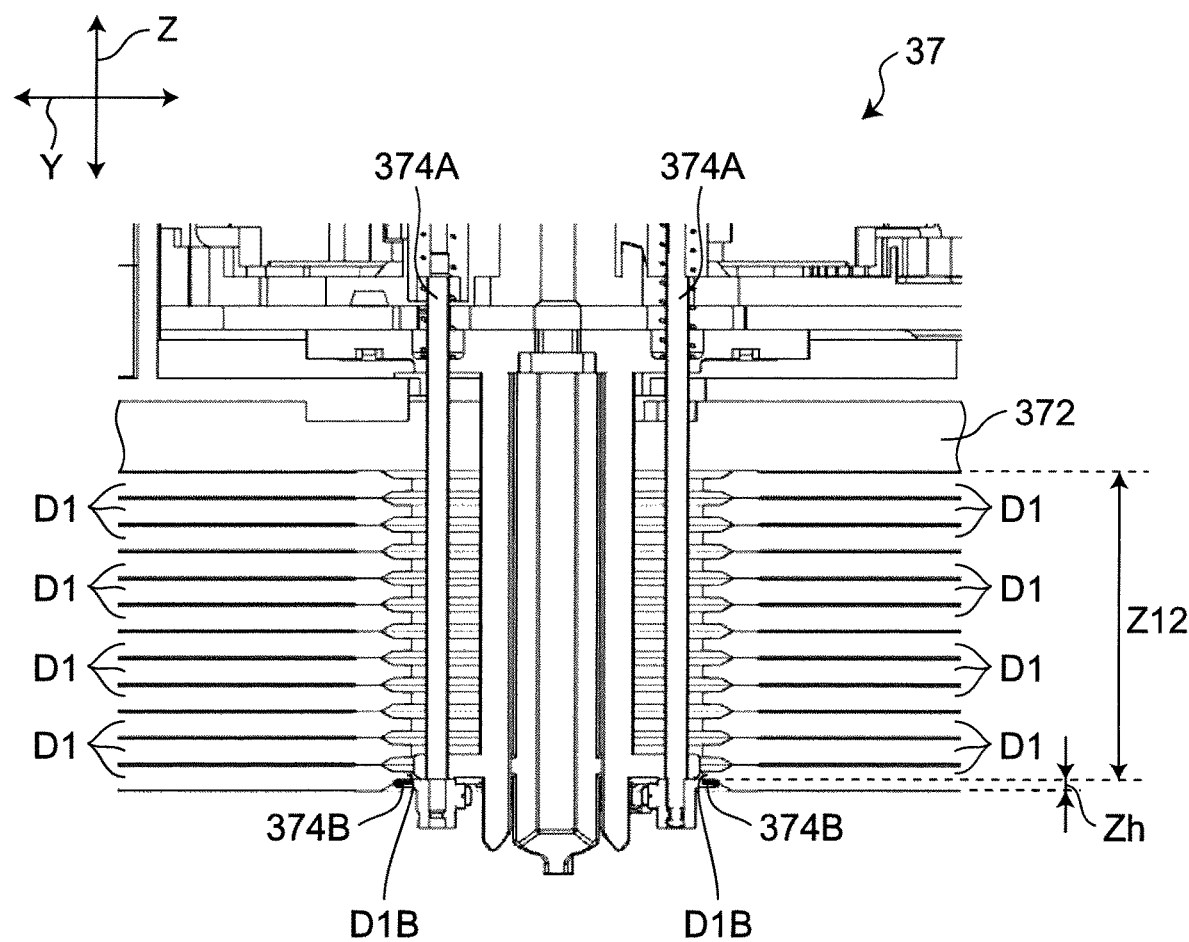
FIG. 23 is a partial cross-sectional view illustrating a state in which the first support claw of the disc selector spindle protrudes below the lowermost disc.

Subsequently, in step S3, the select hook drive unit 91 (see FIG. 12) rotates the first support claw 374B to protrude in a state in which the first support claw 374B of the select hook 374 of the disc selector spindle 371 is located below the lowermost disc of the plurality of discs D1 stacked on the disc tray 32 as illustrated in FIGS. 22A, 22B, and 23.

Subsequently, in step S4, the disc tray 32 descends and all of the plurality of discs D1 stacked on the disc tray 32 is placed on the first support claw 374B of the select hook 374.

Subsequently, in step S5, the data processing unit 7A detects the displacement amount Z12 from the counted value of the encoder 45 in a state in which all the twelve discs D1 are placed on the first support claw 374B (see FIG. 23). The displacement amount Z12 is a displacement amount of the disc press 372 from the initial position when all the discs D1 stored in the disc tray 32 are suspended by the disc selector 37. The height of the first support claw 374B with respect to the disc press 372 is detected based on the detected displacement amount Z12.

Subsequently, in step S6, the select hook drive unit 91 and the drop hook drive unit 92 alternately rotate the select hook 374 and the drop hook 375, respectively, and thus, one disc D1 is stored in the disc tray 32 by removing only the lowermost disc D1. At this time, since the disc press 372 descends by the thickness of one disc, the sheet 43 also descends. At this time, eleven discs D1 are placed on the first support claw 374B.

Subsequently, in step S7, the encoder 45 detects a count value in a state in which the number of discs placed on the first support claw 374B is decreased by one, and the data processing unit 7A detects a distance (displacement amount) Z11 from this count value. A distance DH12 obtained by subtracting the distance Z11 from the distance Z12 is a thickness of the lowermost (twelfth from the top) disc D1. As described above, the thickness of the disc includes an inter-pitch distance of the inner peripheral portion of each of the stacked discs D1. The height of the first support claw 374B with respect to the disc press 372 is detected based on the detected distance Z11.

Subsequently, in step S8, the data processing unit 7A determines whether all the discs D1 placed on the first support claw 3745 of the select hook 374 are removed. The data processing unit counts the number of removed discs D1, and calculates the number of discs D1 suspended by the disc selector 37 based on the counted number. As a result, when the disc is still placed on the first support claw 374B (No in step S8), the processing returns to step S6. By doing this, thicknesses DH12, DH11, DH10, . . . , and DH1 of twelve discs D1 are sequentially detected, and the thicknesses are stored as a look-up table in the storage unit 7B. A distance from the lower surface of the inner peripheral portion of the disc D1 to the lower surface of the disc press 372 is stored as the thickness DH1 of the uppermost disc D1. The look-up table is prepared for each disc tray 32, and records the thicknesses of all the discs D1 stored in the tray stacks 31A and 31B.

When it is determined in step S8 that all the discs D1 are removed from the first support claw 374B (Yes in step S8), the measurement of the disc thickness is ended.

Since these operations from step S1 to step S8 may be performed when the disc device 3 is shipped from the factory or the disc device 3 is set up, it does not take a time to measure the disc thickness at the time of actually selecting the disc D1.

Figure 24:
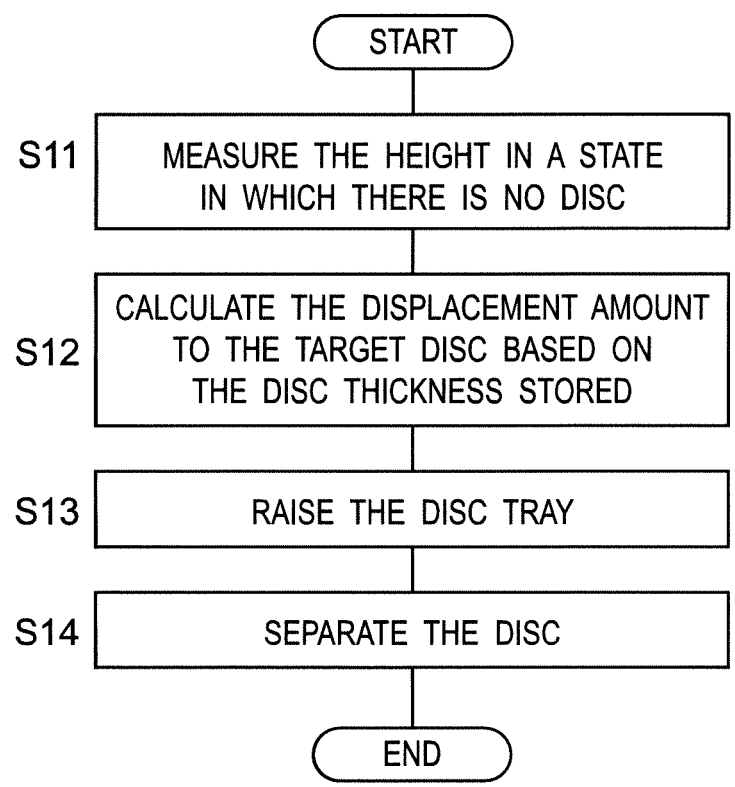
FIG. 24 is a flowchart illustrating a flow of selecting the disc.
Figure 25:
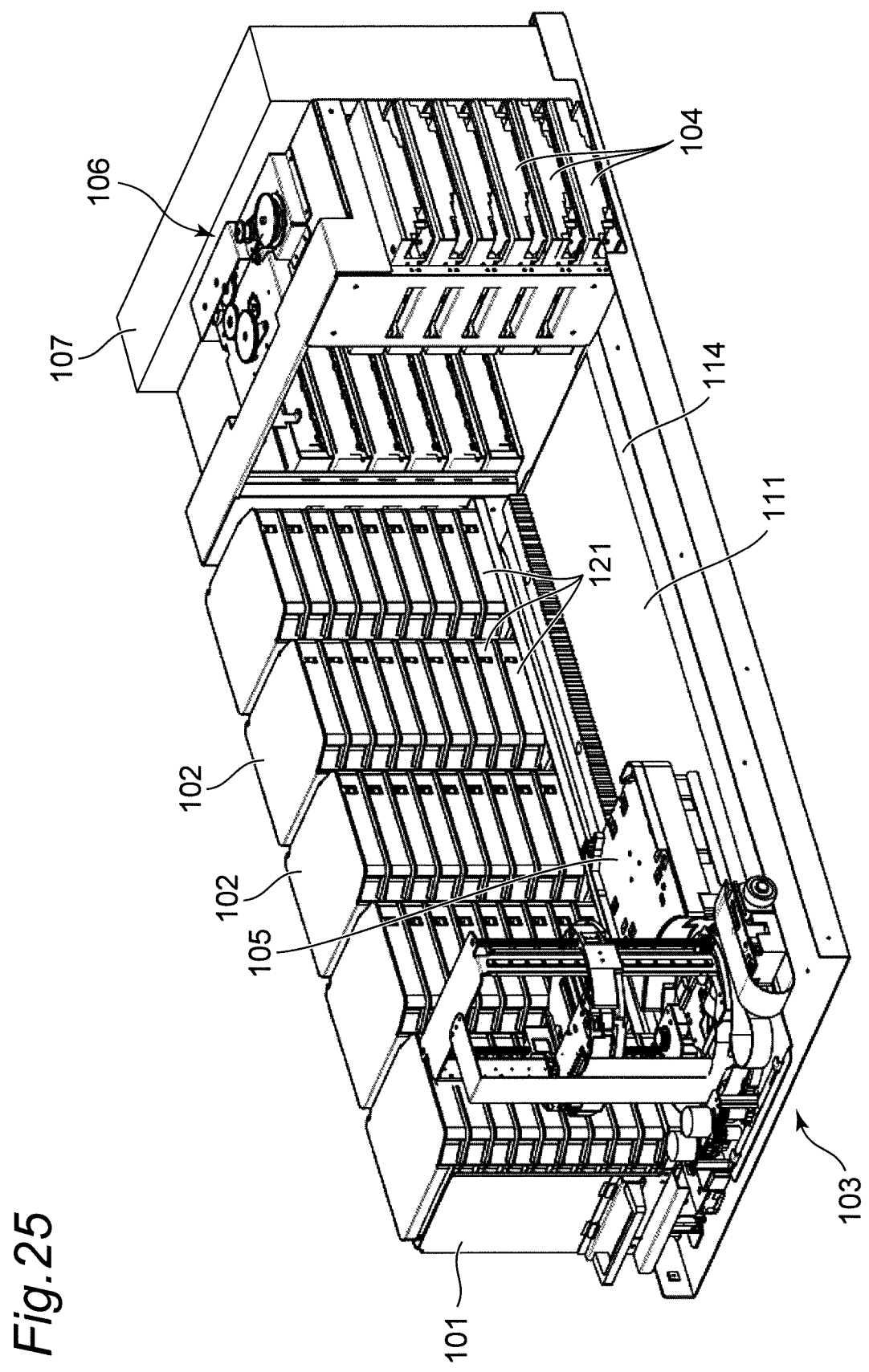
FIG. 25 is a perspective view schematically illustrating a schematic configuration of a disc device of the related art.

Next, a procedure for directly selecting a target disc D1 from the plurality of discs D1 stacked on the disc tray 32 will be described with reference to FIG. 24. FIG. 24 is a flowchart illustrating a flow of selecting the disc.

As in step S1, in step S11, when the disc tray 32 does not ascend with respect to the disc selector 37, the height h0 of the sheet 43 and the height of the first support claw 374B with respect to the disc press 372 in a state in which the top surface of the plurality of discs D1 stacked on the disc tray 32 does not come in contact with the disc press (at the initial position) are measured. The height h0 is a position at which the displacement amount of the disc press 372 is zero.

In step S12, a displacement amount Z2 to the target disc is calculated based on each disc thickness stored in the look-up table of the storage unit 7B. For example, a distance to an intermediate position of a gap between the target disc and the disc below the target disc by one can be calculated as the displacement amount Z2 by adding 0.365 mm to the disc thickness of each disc to the target disc.

Subsequently, in step S13, the disc tray 32 ascends by the calculated displacement amount Z2. The disc tray 32 is stopped at a point of time when the displacement amount becomes Z2 from the counted value of the encoder 45.

Subsequently, in step S14, the select hook drive unit 91 rotates the first support claw 374B of the select hook 374, and thus, the first support claw 374B protrudes to a lower surface of the inner peripheral surface of the target disc D1. Thereafter, the disc tray 32 descends, and thus, the target disc D1 is suspended at the lowest position of the disc tray spindle 321. As described above, since the target disc D1 can be directly selected from the state stored in the disc tray 32, it is possible to reduce a time to select the disc.

Next, a difference between a disc thickness measurement method using a laser displacement meter and the disc thickness measurement method according to the embodiment will be described. As a method of detecting the thickness of the disc D1, the method using the laser displacement meter is also considered. However, when the laser displacement meter is used, since a laser beam needs to be reflected on the upper surface of the disc, the distance cannot be measured with the transparent disc D1. Therefore, it is necessary to use a colored disc D1 or to place a colored dummy disc on the highest position of the stacked discs D1. The laser displacement meter needs to have a size of about 60 mm in the height direction (Z direction), and further needs to have an interval of about 20 mm between the laser displacement meter and a disc surface. Therefore, it is necessary to form a space of about 80 mm from the upper surface of the uppermost disc D1.

According to the disc device 3 of the embodiment, the disc selector 37 includes the disc tray spindle 321 that supports the plurality of discs D1, the disc press 372 on which the upper surface of the uppermost disc D1 of the plurality of discs D1 supported by the disc selector spindle 371 abuts, the displacement amount detection mechanism 11A that detects the displacement amount of the disc press 372 displaced according to the thicknesses of the plurality of supported discs D1, and the thickness detection unit 11B that detects the thickness of each of the plurality of discs D1 based on the detected displacement amount of the disc press 372. Since the thickness of the disc D1 is detected based on the displacement amount of the disc press 372 without using the laser displacement meter, the size of the displacement amount detection mechanism 11A in the height direction needs to be a height corresponding to the thickness of the total number of stacked discs D1 and the thickness of the disc press 372. When the number of stacked discs D1 is, for example, twelve, the thickness of the disc D1 can be detected at a height of about 25 mm from the upper surface of the uppermost disc D1. As described above, according to the disc device 3 of the embodiment, the displacement amount detection mechanism 11A with a small space can be realized. Since the thickness of the disc D1 is detected based on the displacement amount of the disc press 372, the detection accuracy of the thickness of the disc D1 can be improved.

The displacement amount detection mechanism 11A includes the column 55 that is connected to the disc press 372 and is displaced in the same direction as the displacement direction of the disc press 372, the sheet 43 that is attached to the column 55, and has the plurality of slits 43A formed in the direction perpendicular to the displacement direction of the column 55, and the encoder 45 that counts the number of slits 43A displaced together with the disc press 372 in the displacement direction of the disc press 372. Since the sheet 43 is attached to the column 55 displaced together with the disc press 372, the displacement amount of the disc press 372 is the same as the displacement of the sheet 43. Since the plurality of slits 43A formed in the sheet 43 is also displaced, the displacement amount of the sheet 43 can be detected by counting the number of the displaced slits 43A. Accordingly, the thickness of the disc D1 can be accurately detected with a simple structure.

The encoder 45 includes a plurality of optical elements 45A and 45B arranged at intervals along the displacement direction of the disc press 372 within the length of the interval between the slits 43A. Accordingly, the displacement amount of the sheet 43 can be detected with a resolution smaller than the interval between the slits 43A. As a result, the detection accuracy of the thickness of the disc D1 can be improved.

The displacement amount detection mechanism 11A includes the first disc press shaft 47 that is connected to the disc press 372 and extends along the displacement direction of the disc selector 37 and the main guide 51 that guides the first disc press shaft 47 in an insertable manner, and the main guide 51 is supported by the chassis 373 of the disc selector 37. Accordingly, since the inclination caused by the movement of the disc press 372 can be reduced, the detection accuracy of the displacement amount of the disc press 372 can be improved. As a result, the thickness of the disc D1 can be accurately measured.

It is possible to further reduce the inclination of the disc press 372 by three configurations of the combination of the first disc press shaft 47 with the main guide 51, the combination of the second disc press shaft 49 with the sub-guide 53, and the combination of the select hook 374 and the drop hook 375 with the opening of the disc press 372.

The displacement amount detection mechanism 11A includes the conical coil spring 377 between the disc press 372 and the chassis 373 of the disc selector 37 which is urged in the direction in which the disc press 372 is separated from the chassis 373. Since the disc press 372 is equally urged by the conical coil spring 377, the inclination caused by the movement of the disc press 372 can be reduced. As a result, the detection accuracy of the displacement amount of the disc press 372 can be improved, and the thickness of the disc D1 can be accurately measured.

The thickness detection unit 11B detects the thickness of each of the plurality of discs D1 based on the displacement amount detected by the encoder 45 in a state in which all the plurality of discs D1 stacked on the disc tray 32 is supported.

The thickness detection unit 11B detects the thickness of each disc D1 based on the displacement amount detected by the encoder 45 when the plurality of discs D1 supported by the disc selector spindle 371 is removed one by one. Accordingly, the thicknesses of the discs D1 can be individually measured.

The disc device 3 includes the storage unit 7B that stores the detected thickness of each disc D1. Since the thickness of each disc D1 is stored in the storage unit 7B, the thickness measurement of the disc D1 may be performed only once. Therefore, it is not necessary to measure the thickness of the disc D1 when the information on the disc D1 is read and written.

The present disclosure is not limited to the aforementioned embodiment, and can be modified as follows.

(1) Although it has been described in the aforementioned embodiment that the thickness of each of the discs D1 is measured one by one, the present invention is not limited thereto. When the variation in the thickness of the disc D1 is small, an average thickness of the disc D1 may be calculated by measuring all the thicknesses of the stacked discs D1 and dividing the measurement result by the number of discs D1. As illustrated in FIG. 23, the upper surface of the first support claw 374B comes in contact with the lower surface of the inner peripheral portion D1B of the disc D1. Therefore, a distance Z12a is calculated by adding a thickness Zh from the lower surface of the inner peripheral portion D1B of the lowermost disc D1 to the lower end portion of the disc D1 to the distance Z12. The thickness Zh is a predetermined value, for example, 0.365 mm. The average thickness of the disc D1 can be calculated by dividing the distance Z12a by 12 which is the number of stacked discs. As described above, the thickness detection unit 11B can detect the thickness of each disc by detecting the total thickness of the stacked discs D1 and dividing the detected total thickness of the discs by the number of stacked discs.

As stated above, the embodiment has been described as an example of the technology of the present disclosure. Thus, the accompanying drawings and detailed description have been provided. Therefore, not only components which are essential for solving the problems but also components which are not essential for solving the problems in order to illustrate the aforementioned technology may be included in the components described in the accompanying drawings and detailed description. Thus, the fact that the non-essential components are described in the accompanying drawings and detailed description should not directly prove that the non-essential components are essential.

In addition, since the aforementioned embodiment is provided in order to illustrate the technology of the present disclosure, various changes, replacements, additions, and omissions can be performed within the scope of the claims or the equivalents thereof.

INDUSTRIAL APPLICABILITY

The disc device according to the present disclosure is particularly useful for a disc device used in a facility that handles a large amount of data such as a data center since it is possible to reduce the time necessary to select the disc.

REFERENCE SIGNS LIST 1 storage
1A opening
2 drawer
2A handle
3 disc device (changer module)
4 case
4A opening
5 rail
6 fan unit
7 control unit
7A data processing unit
7B storage unit
9 drive mechanism
11 thickness detection unit
11A displacement amount detection mechanism
11B thickness detection unit
31A tray stack
31B tray stack
32 disc tray
33 changer unit
34 drive unit
34A tray
35 casing
35A connector
35B lock bar
35C inner wall
35D stay
36 tray carrier
37 disc selector
38 chassis
39 handle
43 sheet
43A slit
45 encoder
45A optical element
45B optical element
47 first disc press shaft
49 second disc press shaft
51 main guide
53 sub-guide
55 column
57 encoder support plate
91 select hook drive unit
91A selection motor
92 drop hook drive unit
92A separation motor
93 cam mechanism
321 disc tray spindle
322 central shaft
323 side plate
371 disc selector spindle
372 disc press
372A first extension portion
372B second extension portion
373 chassis
374 select hook
374A first shaft
374B first support claw
374C selection lever
374D fixing pin
374E engagement pin
374F connection bar
375 drop hook
375A second shaft
375B second support claw
375C third support claw
375D separation lever
376 fixing plate
377 conical coil spring
D1 disc
D1A center hole
D1B inner peripheral portion

The invention claimed is:

1. A disc device comprising:
a disc tray which stores a plurality of stacked discs;
a tray carrier which transports the disc tray; and
a disc selector which supplies one disc of the plurality of discs stacked on the disc tray to a drive unit,
wherein the disc selector includes
a disc selector spindle that supports the plurality of discs,
a disc press on which an upper surface of an uppermost disc of the plurality of discs supported by the disc selector spindle abuts,
a displacement amount detection mechanism that detects a displacement amount of the disc press displaced according to thicknesses of the plurality of supported discs, and
a thickness detection unit that detects a thickness of each of the plurality of discs based on the detected displacement amount of the disc press.

2. The disc device according to claim 1, wherein
the displacement amount detection mechanism includes
a column that is connected to the disc press, and is displaced in the same direction as a displacement direction of the disc press,
a film that is attached to the column, and has a plurality of slits formed in a direction perpendicular to the displacement direction of the column, and
an encoder that counts the number of slits displaced together with the disc press in the displacement direction of the disc press.

3. The disc device according to claim 2, wherein the encoder includes a plurality of optical elements arranged at intervals along the displacement direction of the disc press within a length of an interval between the slits.

4. The disc device according to claim 1, wherein
the displacement amount detection mechanism includes
a shaft that is connected to the disc press, and extends along a displacement direction of the disc selector, and
a guide that guides the shaft in an insertable manner, and
the guide is supported by a chassis of the disc selector.

5. The disc device according to claim 4, wherein the displacement amount detection mechanism includes a conical coil spring that is urged in a direction in which the disc press is separated from the chassis between the disc press and the chassis of the disc selector.

6. The disc device according to claim 2, wherein the thickness detection unit detects the thickness of each of the plurality of discs based on the displacement amount detected by the encoder in a state in which all the plurality of discs stacked on the disc tray is supported.

7. The disc device according to claim 6, wherein the thickness detection unit detects the thickness of each disc by detecting a total thickness of the stacked discs and dividing the detected total thickness of the discs by the number of stacked discs.

8. The disc device according to claim 6, wherein the thickness detection unit detects the thickness of each disc based on each displacement amount detected by the encoder when the plurality of discs supported by the disc selector spindle is removed one by one.

9. The disc device according to claim 1, further comprising:
   a storage unit that stores the detected thickness of each disc.

* * * * *